US 9,533,869 B2

(12) United States Patent
Veltrop et al.

(10) Patent No.: US 9,533,869 B2
(45) Date of Patent: *Jan. 3, 2017

(54) PINCH VALVE FOR DISPENSER FOR LIQUIDS

(71) Applicant: Prince Castle LLC, Carol Stream, IL (US)

(72) Inventors: Loren Veltrop, Chicago, IL (US); Christopher Lyons, LaGrange Park, IL (US)

(73) Assignee: Prince Castle LLC, Carol Stream, IL (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/470,520

(22) Filed: Aug. 27, 2014

(65) Prior Publication Data

US 2015/0021360 A1     Jan. 22, 2015

Related U.S. Application Data

(63) Continuation of application No. 13/971,089, filed on Aug. 20, 2013, now abandoned, which is a
(Continued)

(51) Int. Cl.
*B67D 7/80*     (2010.01)
*F16K 7/04*     (2006.01)
(Continued)

(52) U.S. Cl.
CPC ............ *B67D 3/041* (2013.01); *B67D 3/0003* (2013.01); *B67D 3/0019* (2013.01);
(Continued)

(58) Field of Classification Search
CPC ..... B67D 3/041; B67D 3/0003; B67D 3/0019; B67D 3/0041; B67D 3/0077; B67D 3/0093; F16L 55/10; F16K 7/02; F16K 7/04; F16K 7/06; F16K 7/061; F16K 7/063; F16K 7/065; F16K 7/066
(Continued)

(56) References Cited

U.S. PATENT DOCUMENTS

| 2,545,118 A | 3/1951 | St. Clair |
| 3,640,430 A | 2/1972 | Roberts |

(Continued)

FOREIGN PATENT DOCUMENTS

| AU | 728683 | 10/1998 |
| CN | 101446833 | 6/2009 |

(Continued)

OTHER PUBLICATIONS

A.C. Dispensing Equipment, Inc. Corrected Petition for Inter Partes Review of U.S. Pat. No. 8,534,497 with Exhibit 1007 Declaration of Julio Militzer, Ph.D. filed Apr. 1, 2014.
(Continued)

*Primary Examiner* — Patrick M Buechner
(74) *Attorney, Agent, or Firm* — Andrus Intellectual Property Law, LLP

(57) ABSTRACT

Fixed-volumes of liquid are measured and dispensed from a container by empirically determining the liquid surface height and opening a dispensing valve for a time period that is calculated using a volume of liquid specified to be dispensed and the empirically-determined liquid surface height. The liquid surface height in the container is determined empirically for initial and subsequent volumes of liquid that are dispensed. Dispensing accuracy is maintained whether the container is full or nearly empty.

19 Claims, 24 Drawing Sheets

Related U.S. Application Data continuation of application No. 12/885,659, filed on Sep. 20, 2010, now Pat. No. 8,534,497.

(51) Int. Cl.
*B67D 3/04* (2006.01)
*F16K 7/06* (2006.01)
*B67D 3/00* (2006.01)

(52) U.S. Cl.
CPC ......... *B67D 3/0041* (2013.01); *B67D 3/0077* (2013.01); *B67D 3/0093* (2013.01); *F16K 7/06* (2013.01)

(58) Field of Classification Search
USPC .................................................. 251/4, 7, 10
See application file for complete search history.

(56) References Cited

U.S. PATENT DOCUMENTS

| | | | |
|---|---|---|---|
| 4,244,218 A | 1/1981 | Wohrl | |
| 4,467,844 A | 8/1984 | DiGianfilippo et al. | |
| 4,481,985 A | 11/1984 | Bruder et al. | |
| 4,586,546 A | 5/1986 | Mezei et al. | |
| 4,630,654 A | 12/1986 | Kennedt, Jr. | |
| 4,804,118 A | 2/1989 | Mullen | |
| 4,821,921 A | 4/1989 | Cartwright et al. | |
| 4,825,758 A | 5/1989 | Snowball et al. | |
| 4,856,563 A | 8/1989 | Yamaguchi et al. | |
| 4,917,265 A | 4/1990 | Chiang | |
| 4,979,641 A | 12/1990 | Turner | |
| 4,997,012 A | 3/1991 | Kuziw | |
| 5,086,816 A | 2/1992 | Mieth | |
| 5,148,841 A | 9/1992 | Graffin | |
| 5,228,594 A | 7/1993 | Aslin | |
| 5,249,706 A | 10/1993 | Szabo | |
| 5,287,896 A | 2/1994 | Graffin | |
| 5,294,022 A | 3/1994 | Earle | |
| 5,303,585 A | 4/1994 | Lichte | |
| 5,340,211 A | 8/1994 | Pratt | |
| 5,353,957 A | 10/1994 | Campau | |
| 5,377,868 A | 1/1995 | Hernandez et al. | |
| 5,544,518 A | 8/1996 | Hart et al. | |
| 5,556,002 A | 9/1996 | Green | |
| 5,566,732 A | 10/1996 | Nelson | |
| 5,570,731 A | 11/1996 | Muscara | |
| 5,586,085 A | 12/1996 | Lichte | |
| 5,588,558 A | 12/1996 | Cox et al. | |
| 5,713,486 A | 2/1998 | Beech | |
| 5,816,445 A | 10/1998 | Gardos et al. | |
| 5,850,757 A | 12/1998 | Wierenga | |
| 5,905,656 A | 5/1999 | Wang et al. | |
| 5,921,440 A | 7/1999 | Maines | |
| 5,953,923 A | 9/1999 | Davies | |
| 5,987,971 A | 11/1999 | Sahm et al. | |
| 6,065,371 A * | 5/2000 | Yacowitz | A61M 37/0076 30/362 |
| 6,186,361 B1 | 2/2001 | Teetsel, III | |
| 6,253,957 B1 | 7/2001 | Messerly et al. | |
| 6,328,881 B1 | 12/2001 | Larkner et al. | |
| 6,401,045 B1 | 6/2002 | Rogers et al. | |
| 6,497,343 B1 | 12/2002 | Teetsel, III | |
| 6,659,311 B2 | 12/2003 | Prueter | |
| 6,792,966 B2 | 9/2004 | Harvey | |
| 6,866,241 B1 * | 3/2005 | Libretto | F16K 7/061 251/7 |
| 7,021,206 B2 | 4/2006 | Eckenhausen et al. | |
| 7,337,920 B2 | 3/2008 | Duck et al. | |
| 7,350,761 B1 * | 4/2008 | Stuart | F16K 7/063 251/10 |
| RE40,310 E | 5/2008 | Larker et al. | |
| 7,606,678 B2 | 10/2009 | Evans | |
| 7,628,342 B2 | 12/2009 | Shimoda et al. | |
| 7,677,412 B2 | 3/2010 | Litterst et al. | |
| 7,712,631 B2 | 5/2010 | Taradalsky et al. | |
| 7,750,817 B2 | 7/2010 | Teller | |
| 8,176,948 B2 | 5/2012 | Carrig | |
| 8,181,822 B2 | 5/2012 | Doelman et al. | |
| 8,277,745 B2 | 10/2012 | Mehus et al. | |
| 8,322,571 B2 | 12/2012 | Hovinen et al. | |
| 8,376,310 B2 * | 2/2013 | Veltrop | F16K 7/04 251/10 |
| 8,534,497 B2 | 9/2013 | Veltrop et al. | |
| 2001/0032863 A1 | 10/2001 | Feygin | |
| 2003/0003208 A1 | 1/2003 | Lassota | |
| 2004/0187570 A1 | 9/2004 | Williamson | |
| 2004/0226452 A1 | 11/2004 | Lyall, III | |
| 2004/0226959 A1 | 11/2004 | Mehus et al. | |
| 2005/0231553 A1 | 10/2005 | Horsnell et al. | |
| 2006/0110512 A1 | 5/2006 | Blomme et al. | |
| 2006/0134598 A1 | 6/2006 | Kenney | |
| 2006/0238346 A1 | 10/2006 | Teller et al. | |
| 2007/0074709 A1 | 4/2007 | Kato et al. | |
| 2007/0108225 A1 | 5/2007 | O'Dougherty | |
| 2007/0192981 A1 | 8/2007 | Lawshe | |
| 2007/0267446 A1 | 11/2007 | Pressler | |
| 2008/0071424 A1 | 3/2008 | St. Jean et al. | |
| 2008/0092642 A1 | 4/2008 | Grimm et al. | |
| 2008/0271928 A1 | 11/2008 | Mehus et al. | |
| 2009/0007938 A1 | 1/2009 | Dubreuil et al. | |
| 2009/0250491 A1 | 10/2009 | Erman et al. | |
| 2009/0306633 A1 | 12/2009 | Trovato et al. | |
| 2010/0065587 A1 | 3/2010 | Erman et al. | |
| 2010/0155415 A1 | 6/2010 | Ashrefzadeh et al. | |
| 2011/0073525 A1 | 3/2011 | Evans | |
| 2011/0165034 A1 | 7/2011 | Carlons | |
| 2012/0018654 A1 * | 1/2012 | Wennberg | F16K 7/06 251/9 |
| 2012/0068093 A1 * | 3/2012 | Veltrop | F16K 7/04 251/7 |
| 2014/0144936 A1 | 5/2014 | Mehus et al. | |
| 2014/0263430 A1 | 9/2014 | Keating et al. | |

FOREIGN PATENT DOCUMENTS

| | | |
|---|---|---|
| GB | 2184853 | 7/1987 |
| WO | 9425354 | 11/1994 |
| WO | 9854553 | 5/1998 |
| WO | 2004037595 | 5/2004 |
| WO | 2005030276 | 4/2005 |
| WO | 2008153535 | 12/2008 |
| WO | 2010038047 | 4/2010 |

OTHER PUBLICATIONS

Preliminary Response by Patent Owner Prince Castle LLC, filed Jun. 30, 2014.
Decision, Institution of Inter Partes Review 37 C.F.R. § 42.108, filed Aug. 11, 2014.
Canadian Office Action in counterpart Canadian Application No. 2,738,192, dated May 28, 2015.
A.C. Dispensing Equipment, Inc. Supplemental Protest filed in Canadian counterpart Application No. 2,738,192, dated Nov. 19, 2014.
Office Action issued on corresponding U.S. Appl. No. 13/925,110, mailed Dec. 17, 2014.
Office Action issued on corresponding U.S. Appl. No. 13/924,744, mailed Dec. 19, 2014.
A.C. Dispensing Equipment, Inc., Reply Brief Institution of Inter Partes Review 37 C.F.R. § 42.108, filed Jan. 12, 2015.
Scanlon, Leo J., "8086/8088/80286 Assembly Language", 1988, p. 280, Simon & Schuster, New York, NY.
Cengal et al., Fluid Mechanics, Fundamentals and Applications; Chapter 12: Radiation Process and Properties, McGraw Hill, Higher Education, Copyright 2006.
Dally et al., Instrumentation for Engineering Measurements, pp. 242-291; John Wiley & Sons, Inc., 1984.
Gerald, Curtis F., Applied Numerical Analysis, 2nd Edition, pp. 465-516, Addison-Wesley Publishing Company, 1978.
Munson et al., Fundamentals of Fluid Mechanics, Fifth Edition, pp. 112-113, Copyright 2006.

(56) References Cited

OTHER PUBLICATIONS

Shames, Irving H., Mechanics of Fluids, 4th Edition, pp. 799-802, McGraw-Hill, New York, NY, USA, 2003.
Pinch Valve Semantics, David Gardellin, President of Onyx Valve Co., available at www.onyxvalve.com, 2011.
Heinz Foodservice, The Heinz Guide to Condiment Dispensing Equipment, 2011.
Silver King, Cream Dispenser Technical Manual and Replacement Parts List Model SKNES2B/3B, 2011.
Silver King, Portion Control Cream Dispensers, 2005.
Silver King, Model SKMCD1P, Equipment Manual for McDonald's, 2005.
Silver King, Majestic Series Milk Dispenser, 2009.
SureShot Dispensing Systems, Suggested Preventive Maintenance Checklist for Refrigerated Liquid Dispenser, Sep. 2006.
SureShot, Flexoshot, Manual Dispense Refrigerated Liquid Dispensers with Optional Illuminated Display, Sep. 2007.
SureShot, Intellishot Advanced Portion Controlled Refrigerated Liquid Dispensers, Sep. 2007.
SureShot Dispensing Systems, Dairy Dispenser Valve Assembly Cleaning Instructions, 2011.
SureShot Dispensing Systems, Sure Touch Refrigerated Liquid Dispenser Operations Manual, 2011.
SureShot Dispensing Systems, SugarShot Granular Sugar Dispensers Parts Catalogue, 2011.
SureShot, Intellishot, Advanced Portion Controlled Refrigerated Liquid Dispensers, Jan. 2011.
Office Action issued in co-pending Canadaian Patent Application 2,738,192, dated Apr. 1, 2014.
Office Action issued on corresponding Canadian Patent Application No. 2,738,183, mailed Dec. 2, 2014.
Final Written Decision in Inter Partes Review Case No. IPR2014-00511, entered Aug. 4, 2015.
Office Action in co-pending U.S. Appl. No. 13/295,110 mailed Jul. 27, 2015.
Office Action in co-pending U.S. Appl. No. 13/924,774 mailed Jul. 29, 2015.

\* cited by examiner $$y = -0.0012x^3 + 0.0207x^2 - 0.1444x + 0.89$$

| Output from Load Cell (Volts) | Valve Open Time (seconds) |
|---|---|
| 8.65 | 0.4131 |
| 8.6 | 0.4159 |
| 8.55 | 0.4186 |
| 8.5 | 0.4212 |
| 8.45 | 0.4238 |
| 8.4 | 0.4264 |
| 8.35 | 0.4289 |
| 8.3 | 0.4314 |
| 8.25 | 0.4338 |
| 8.2 | 0.4361 |
| 8.15 | 0.4385 |
| 8.1 | 0.4408 |
| 8.05 | 0.4430 |
| 8 | 0.4452 |
| 7.95 | 0.4474 |
| 7.9 | 0.4495 |
| 7.85 | 0.4516 |
| 7.8 | 0.4536 |
| 7.75 | 0.4556 |
| 7.7 | 0.4576 |
| 7.65 | 0.4595 |
| 7.6 | 0.4614 |
| 7.55 | 0.4633 |
| 7.5 | 0.4651 |
| 7.45 | 0.4669 |
| 7.4 | 0.4687 |
| 7.35 | 0.4704 |
| 7.3 | 0.4722 |
| 7.25 | 0.4739 |
| 7.2 | 0.4755 |
| 7.15 | 0.4771 |
| 7.1 | 0.4788 |

FIG. 17A

| | |
|---|---|
| 7.05 | 0.4803 |
| 7 | 0.4819 |
| 6.95 | 0.4834 |
| 6.9 | 0.4850 |
| 6.85 | 0.4865 |
| 6.8 | 0.4879 |
| 6.75 | 0.4894 |
| 6.7 | 0.4908 |
| 6.65 | 0.4923 |
| 6.6 | 0.4937 |
| 6.55 | 0.4950 |
| 6.5 | 0.4964 |
| 6.45 | 0.4978 |
| 6.4 | 0.4991 |
| 6.35 | 0.5005 |
| 6.3 | 0.5018 |
| 6.25 | 0.5031 |
| 6.2 | 0.5044 |
| 6.15 | 0.5057 |
| 6.1 | 0.5070 |
| 6.05 | 0.5083 |
| 6 | 0.5096 |
| 5.95 | 0.5109 |
| 5.9 | 0.5122 |
| 5.85 | 0.5134 |
| 5.8 | 0.5147 |
| 5.75 | 0.5160 |
| 5.7 | 0.5172 |
| 5.65 | 0.5185 |
| 5.6 | 0.5198 |
| 5.55 | 0.5210 |
| 5.5 | 0.5223 |

FIG. 17B

| | |
|---|---|
| 7.05 | 0.4803 |
| 7 | 0.4819 |
| 6.95 | 0.4834 |
| 6.9 | 0.4850 |
| 6.85 | 0.4865 |
| 6.8 | 0.4879 |
| 6.75 | 0.4894 |
| 6.7 | 0.4908 |
| 6.65 | 0.4923 |
| 6.6 | 0.4937 |
| 6.55 | 0.4950 |
| 6.5 | 0.4964 |
| 6.45 | 0.4978 |
| 6.4 | 0.4991 |
| 6.35 | 0.5005 |
| 6.3 | 0.5018 |
| 6.25 | 0.5031 |
| 6.2 | 0.5044 |
| 6.15 | 0.5057 |
| 6.1 | 0.5070 |
| 6.05 | 0.5083 |
| 6 | 0.5096 |
| 5.95 | 0.5109 |
| 5.9 | 0.5122 |
| 5.85 | 0.5134 |
| 5.8 | 0.5147 |
| 5.75 | 0.5160 |
| 5.7 | 0.5172 |
| 5.65 | 0.5185 |
| 5.6 | 0.5198 |
| 5.55 | 0.5210 |
| 5.5 | 0.5223 |

FIG. 17C

| | |
|---|---|
| 3.8 | 0.5743 |
| 3.75 | 0.5763 |
| 3.7 | 0.5783 |
| 3.65 | 0.5804 |
| 3.6 | 0.5824 |
| 3.55 | 0.5846 |
| 3.5 | 0.5867 |
| 3.45 | 0.5889 |
| 3.4 | 0.5912 |
| 3.35 | 0.5935 |
| 3.3 | 0.5958 |
| 3.25 | 0.5982 |
| 3.2 | 0.6006 |
| 3.15 | 0.6030 |
| 3.1 | 0.6055 |
| 3.05 | 0.6081 |
| 3 | 0.6107 |
| 2.95 | 0.6134 |
| 2.9 | 0.6161 |
| 2.85 | 0.6188 |
| 2.8 | 0.6216 |
| 2.75 | 0.6245 |
| 2.7 | 0.6274 |
| 2.65 | 0.6304 |
| 2.6 | 0.6334 |
| 2.55 | 0.6365 |
| 2.5 | 0.6396 |
| 2.45 | 0.6428 |
| 2.4 | 0.6461 |
| 2.35 | 0.6494 |
| 2.3 | 0.6528 |
| 2.25 | 0.6562 |
| 2.2 | 0.6597 |
| 2.15 | 0.6633 |

FIG. 17D

| | |
|---|---|
| 2.1 | 0.6669 |
| 2.05 | 0.6706 |
| 2 | 0.6744 |
| 1.95 | 0.6782 |
| 1.9 | 0.6821 |
| 1.85 | 0.6861 |
| 1.8 | 0.6901 |
| 1.75 | 0.6943 |
| 1.7 | 0.6984 |
| 1.65 | 0.7027 |
| 1.6 | 0.7070 |
| 1.55 | 0.7114 |
| 1.5 | 0.7159 |
| 1.45 | 0.7205 |
| 1.4 | 0.7251 |
| 1.35 | 0.7298 |
| 1.3 | 0.7346 |
| 1.25 | 0.7395 |
| 1.2 | 0.7445 |
| 1.15 | 0.7495 |
| 1.1 | 0.7546 |

FIG. 17E

PINCH VALVE FOR DISPENSER FOR LIQUIDS

CROSS-REFERENCE TO RELATED APPLICATION

The present application is a continuation of U.S. patent application Ser. No. 13/971,089, filed on Aug. 20, 2013, which is a continuation of U.S. patent application Ser. No. 12/885,659, filed on Sep. 20, 2010 and granted as U.S. Pat. No. 8,534,497 on Sep. 17, 2013, the contents of which are hereby incorporated herein by reference in their entireties.

FIELD OF THE INVENTION

This invention relates to a liquid dispenser. More particularly, this invention relates to a dispenser for dairy products, which can dispense small, fixed-volumes of liquid from a bag, tank or basin, or other container and, continue to accurately deliver specified amounts as the liquid in the container is depleted.

BACKGROUND

Many restaurants and food service providers provide coffee and other beverages into which a small volume of creamer or other liquid is added. The prior art dispensers for such liquids open a valve for a time period that is determined using an initial level of the liquid in the container. As liquid is dispensed over time, the level of the liquid in the tank drops of course, lowering the static pressure at the valve and as a result, reducing the volumetric flow rate from the tank.

Some prior art creamer dispensers are able to dispense different fixed amounts of liquid by actuating one or more push button switches on the front panel of the device. The switches send a signal to a computer or other controller, which opens an electrically-actuated dispensing valve for a time period that is supposed to allow the volume of liquid that was requested by the actuation of a push button to be dispensed from a bulk container. Such prior art dispensers require a user to accurately fill the container and specify the starting volume to a controller. The controller calculates dispensing valve open times for each dispensing using the starting or initial liquid level. Prior art devices account for the continuously-dropping static pressure by counting the number of ounces that are requested to be dispensed from the container. The number of ounces that are requested is used to decrement an initial amount of liquid in the container. The volume dispensing accuracy of prior art devices thus depends in part on the accuracy of the initial level that is provided to the controller.

Electromechanical closure of a pinch valve is typically accomplished by activating a solenoid to draw a spring-biased bar or gate against an elastomeric sleeve or tube, thereby cutting off fluid flow through the tube or sleeve. Some prior art pinch valves are fluid actuated wherein the pinching action is accomplished by air or hydraulic pressure placed on the elastomeric sleeve or tube.

A problem with prior art pinch valves, especially those used with food and liquid dispensers, is that they do not facilitate the installation and removal of a bulk container. Stated another way, prior art pinch valves typically require disassembly to install and/or remove a tube passing through them and also for cleaning.

A problem with liquid dispensers that count the number of dispensing actuations, or which decrement a user-specified starting amount in a container according to the number of dispensing actuations, is that their accuracy depends largely on whether the initial amount of liquid in a container was accurate. If the actual starting level in the container is not what is conveyed to the controller when the container is first installed, every subsequently dispensed volume will not be equal to the requested amount.

Another problem with prior art dispensers is that dispensing accuracy almost invariably deteriorates as the level of the liquid in a container falls with successive dispenses. Dispensing valves require a finite amount of time to open and close. Different valves can require slightly different amounts of time to open and close. The amount of liquid actually dispensed rarely matches the amount of liquid that is supposed to be dispensed. Over time, the dispensing error accumulates. As the liquid level in a container approaches zero, the amount of liquid that is actually dispensed for any specified valve open time period will almost always be different from what the dispenser counts or thinks was dispensed. A liquid dispenser that is able to more accurately dispense user-specified volumes without regard to an initial or starting volume and which can continue to do so as a tank empties would be an improvement over the prior art.

BRIEF DESCRIPTION OF THE DRAWINGS

FIGS. 17A-17E provide a table of valve open time in seconds as a function of load cell output in volts.

DETAILED DESCRIPTION

Figure 1:
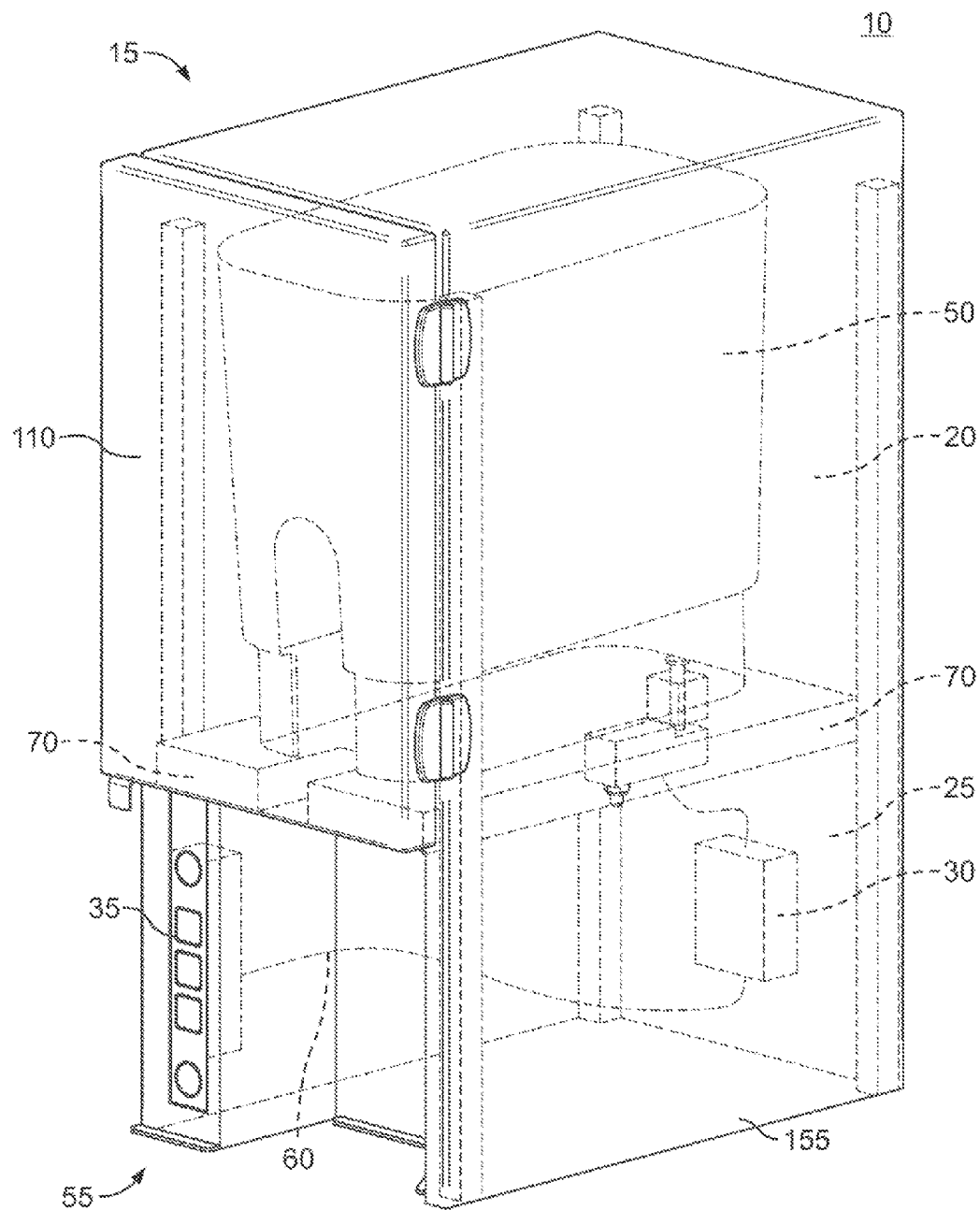
FIG. 1 is a perspective view of a dispenser for liquids.

FIG. 1 is a perspective view of a liquid dispenser apparatus 10 for dispensing specific volumes of liquids. The liquids that can be dispensed have viscosities that vary from about 1 centipoise to about 7500 centipoise. The dispensable liquids thus include low viscosity alcohols, water, juices, moderate viscosity liquids like dairy products such as milk and cream, and viscous liquids that include oils including petroleum products and syrups. The dispensable volumes range from fractions of a liquid ounce up to volumes measured in gallons. An important feature of the apparatus is that unlike prior art dispensers, the apparatus 10 permits an operator to manually dispense any volume of liquid and immediately thereafter, resume accurately dispensing user-requested fixed volumes without losing accuracy of the dispensed volumes.

The apparatus 10 is comprised of a cabinet 15 having a refrigerated upper compartment 20 and an unrefrigerated lower compartment 25. The lower compartment 25 encloses refrigeration equipment used to keep the upper compartment cold. Refrigeration equipment is well known and omitted from the figures for clarity.

The lower compartment 25 encloses a control computer 30. The computer 30 is preferably embodied as a single-chip microcontroller with on-board memory. Such microcontrollers are well known to those of ordinary skill in the art. Many of them have electrical interfaces on the microcontroller which send and receive electrical signals to and from other circuitry and devices, not shown but which interface, i.e., electrically connect, the computer 30 to peripheral devices that include an array of push-button, operator-actuated dispensing control switches 35, a dispensing control valve 40 not visible in FIG. 1. In alternate embodiments described below, the computer 30 is coupled to various devices described below, which are used to determine the level of the liquid 45 in the tank 50.

The dispensing valve 40 is a pinch valve. The pinch valve 40 pinches off, i.e., closes, a flexible dispensing tube that extends from the container 50. Exemplary embodiments of the dispending valve 40 are explained more fully below.

Figure 20:
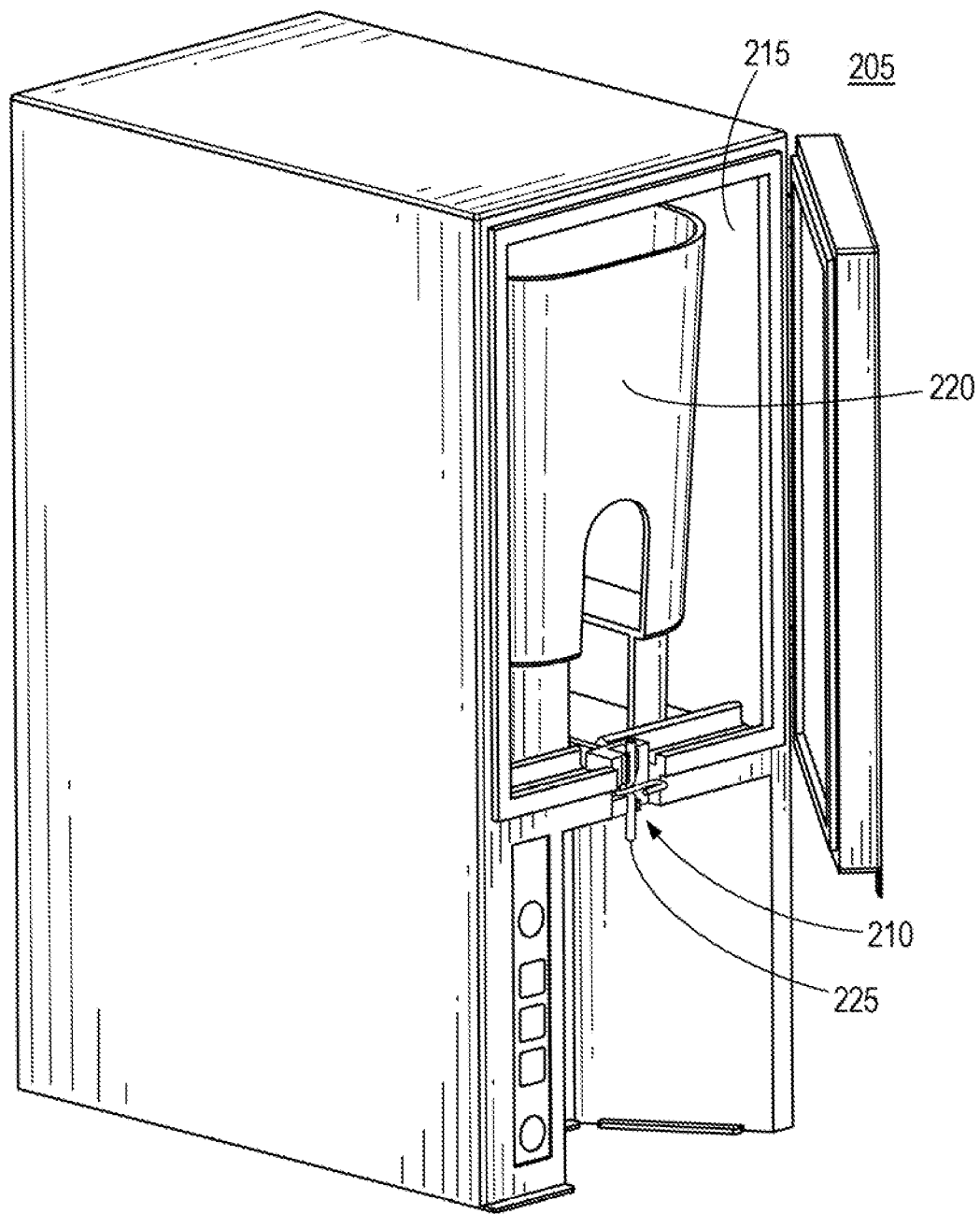
FIG. 20 is a perspective view of a dispenser for liquids, including a pinch valve.

FIGS. 20-27 depict exemplary embodiments and features which may be found in exemplary embodiment of pinch valves as disclosed in further detail herein. FIG. 20 is a perspective view of a dispenser for liquids 205. As disclosed in further detail herein, the dispenser 205 is able to consistently dispense user-selectable, fixed-volumes of dairy products using in part, an electrically-actuated, computer controlled pinch valve 210.

The dispenser 205 has a cabinet for liquids to be dispensed from replaceable bulk containers 220, which are well known to those of ordinary skill in the food service art. The bulk containers 220 can be embodied as a tank having elongated flexible tube through which liquid in the tank can be drawn. Other bulk containers include disposable, flexible bladders integrally formed with flexible dispensing tubes.

Figure 21:
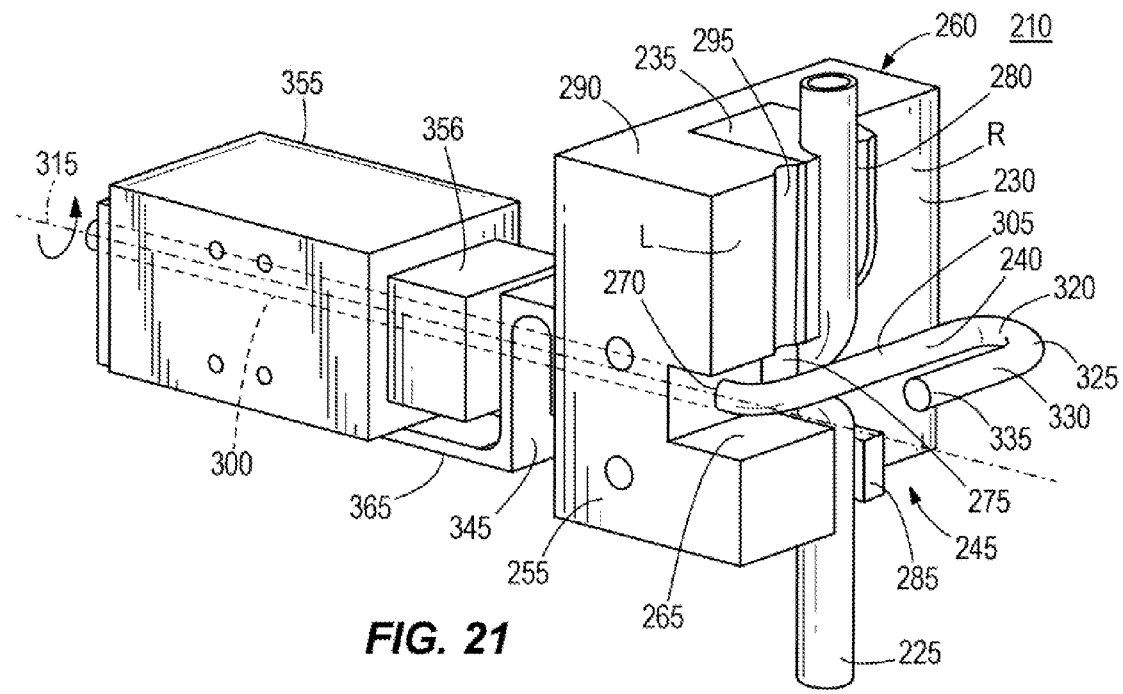
FIG. 21 is a perspective view of a preferred embodiment of a pinch valve, capable of use in the dispenser shown in FIG. 20, viewed from its front, left side.

Liquids are controllably dispensed from a container 220 having a flexible discharge tube 225 using a pinch valve 210 located at the bottom of and partially extending through the bottom of the upper, refrigerated portion 215 of the apparatus 205. A short length of flexible discharge tubing 225 is shown in FIG. 21 as passing "through" the pinch valve 210. The tubing 225 would ordinarily extend from, or be connected to, a bulk container 220 in the refrigerated portion 215 as shown in FIG. 20.

FIG. 21 is a perspective view of a preferred embodiment of the pinch valve 210, viewed from its left front. The valve 210 is comprised of block of rigid material having at least one, relatively flat vertical surface 275 on the front 245 of the block, against which a pinch bar 240 can exert a compressive force against a flexible tube 225 placed between the flat surface 275 and pinch bar 240. The block of rigid material and the flat surface 275 are considered to be a valve body 230.

In the preferred embodiment, the valve body 230 is comprised of plastic, molded around a block of aluminum 235. The block of aluminum 235 has the aforementioned flat surface 275 but it is also formed with vertically-oriented U-shaped channels above and below the flat surface 275. The width and depth of the channels are sized to receive at least part of the outside surface of a dispensing tube 225. The channels act to hold the dispensing tube 225 vertically, i.e., keep the tube 225 aligned at a right angle to the pinch bar 240. For identification purposes, the block of aluminum with the alignment channels is referred to herein as a dispensing tube alignment block 235. Being made of a thermally conductive material, the alignment block 235 also acts as a heat sink that absorbs heat from a tube passing through the block 235. The aluminum block 235 is preferably in thermal communication with the refrigerated portion of the cabinet.

Flexible tubing 225 can be pinched and un-pinched by the pinch bar 240 as it translates horizontally, relative to the vertically-oriented flat surface 275 of the alignment block 235. In a preferred embodiment, the pinch bar 240 has a shape reminiscent of the upper-case letter "L." One leg of the pinch bar 240 extends through a hole, preferably formed through the valve body 230, through a bias spring on the rear side of the valve body where it connects with is solenoid. In an alternate embodiment, the pinch bar translates through a hole formed in a surface of the cabinet instead of the valve body.

In FIG. 21, the tubing 225 is depicted as being pinched, which closes the tube 225. Stated another way, the valve 210 is opened by pulling or otherwise moving the pinch bar 240 away from the flat surface 275 or other surface of the dispensing tube alignment block 235 against which the pinch bar 240 applies force to the tube. The pinch bar is therefore configured as shown so that it can be pulled away from the valve body 230 manually in order to manually dispense liquids but also to rotate the pinch bar 240 away from the tube 225 to facilitate the removal and replacement of the tube 225. The manual and automatic operation of the pinch bar 240 and the ability of the pinch bar to be rotated away from the tube is described below.

As can be seen in the figures, the valve body 230 has a front side 245 that faces outwardly from the cabinet 205 and toward a user. The valve body 230 also has a substantially flat or planar rear side 250, the edge of which can be seen in FIG. 24 and FIG. 25. Back and forth movement of the pinch bar 240 relative to the front face 245 of the valve body 230 closes and opens the tube 225 by the pinch bar 240 pinching and un-pinching the tube 225, respectively. The time that the valve is open, i.e., the tube is un-pinched, determines the volume (or weight) of liquid that is dispensed through the valve. The determination of the valve open time is described in further detail herein.

Figure 27:
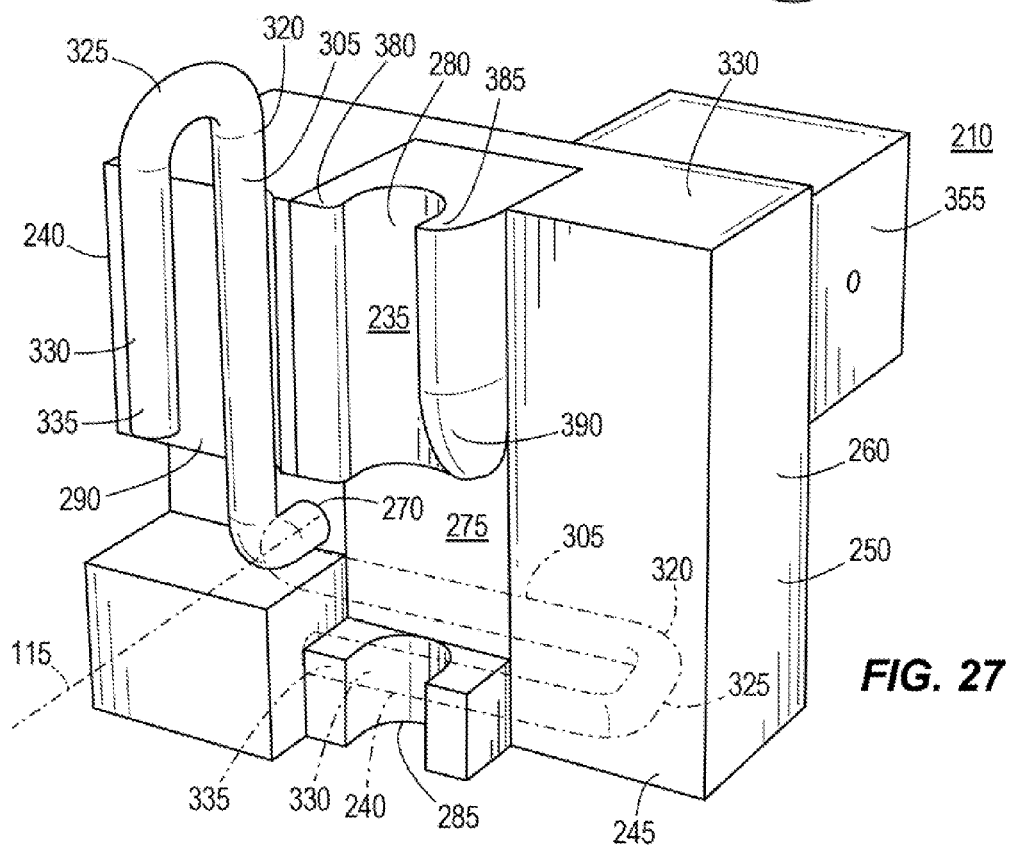
FIG. 27 is a perspective view of the pinch valve showing the pinch bar in two, different angular positions.

The valve body has a left side face 255 and an opposing right side face 260. The left-hand side L of the valve body 230 is slightly thicker than the right-hand side R to form a raised stop block 290. The raised stop block portion 290 provides a park position for the pinch bar 240, when the pinch bar 240 is rotated vertical, as shown in FIG. 27. The pinch bar 240 is rotated as shown in FIG. 27 when the tube 225 is being replaced or when needed to hold the valve 210 open. A vertically oriented shallow groove 295 formed into the front surface of the left-hand side L of the stop block 290 provides a detent for the pinch bar 240 when the pinch bar 240 is rotated vertically. Below the groove 295, a horizontal notch 265 having a rectangular cross section is formed in the left hand side L of the valve body 230. A hole 270 for the pinch bar 240 extends completely through the left-side of the plastic valve body 230 and is located at the bottom of the notch 265. In the preferred embodiment, the bottom of the notch 265 is substantially coplanar with a substantially planar and adjacent surface 275 formed on the aluminum dispensing tube alignment block 235. The planar surface 275 is considered herein to be a "valve surface" in the sense that it cooperates with the pinch bar 240 to open and close a tube 225 by the translation of the pinch bar. The planar surface/valve surface is vertically between U-shaped channels 280 and 285.

Alternate embodiments of the valve 210 include using valve surfaces that are not planar. The term valve surface should there be construed to include surfaces that are raised or articulated above a planar area. Stated another way, the valve surface can be convex.

The pinch bar 240 opens and closes the tube 225 by translating between a valve-closed position and a second, valve open position. The pinch bar 240 closes the tube 225 when the pinch bar 240 is drawn toward the planar surface 275 on the aluminum dispensing tube alignment block 235. The pinch bar 240 opens the tube 225 when the pinch bar 240 is urged away from the planar surface 275 on the aluminum dispensing tube alignment block 235.

Figure 26:
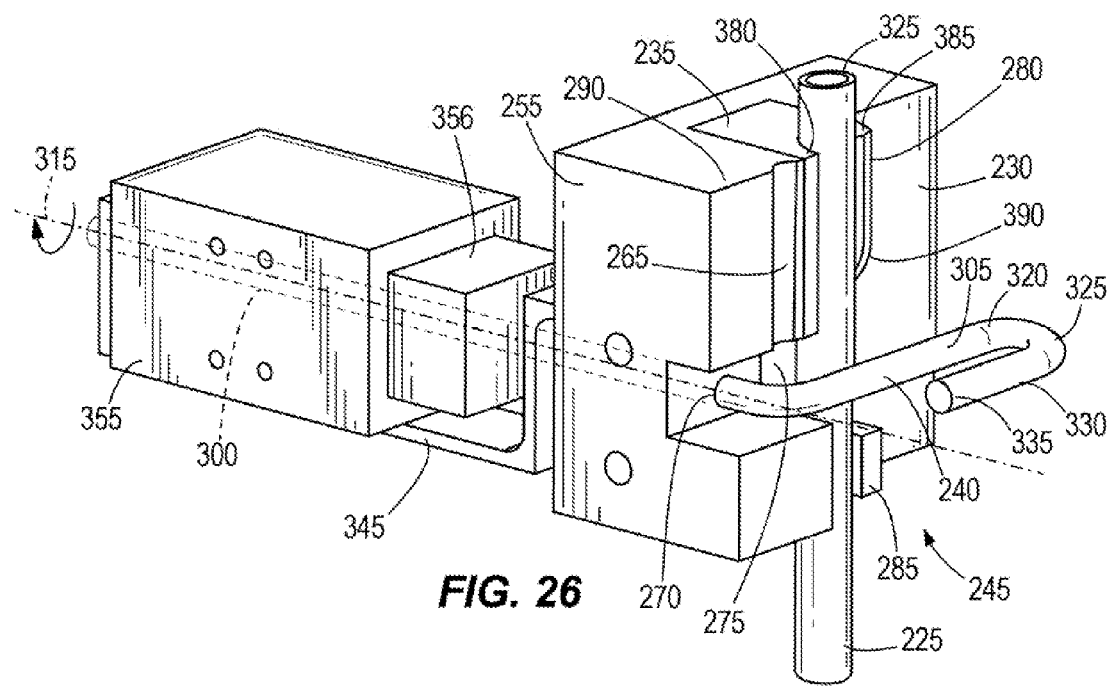
FIG. 26 is a perspective view of a preferred embodiment of a pinch valve, viewed from its right front side.

In the embodiments shown in the figures, the translation between the first and second positions takes place in a substantially horizontal plane due to the fact that the pinch bar 240 and its various sections are substantially co-planar. In alternate embodiments, however, translations between the first and second, valve open/valve closed positions takes place in other directions and in other, non-horizontal planes. In an embodiment, as shown in FIGS. 26 and 27, the pinch bar 240 rotates about the axis of rotation 315 between the first and second positions as described in more detail herein.

Figure 22:
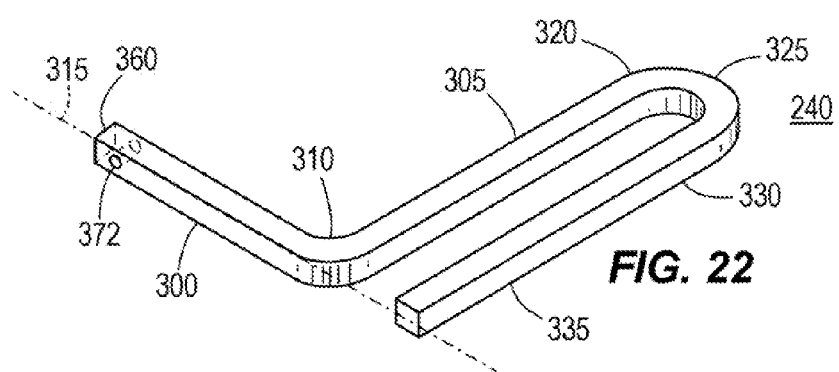
FIG. 22 and FIG. 23 are perspective views of two different embodiments of a substantially L-shaped pinch bar.
Figure 23:
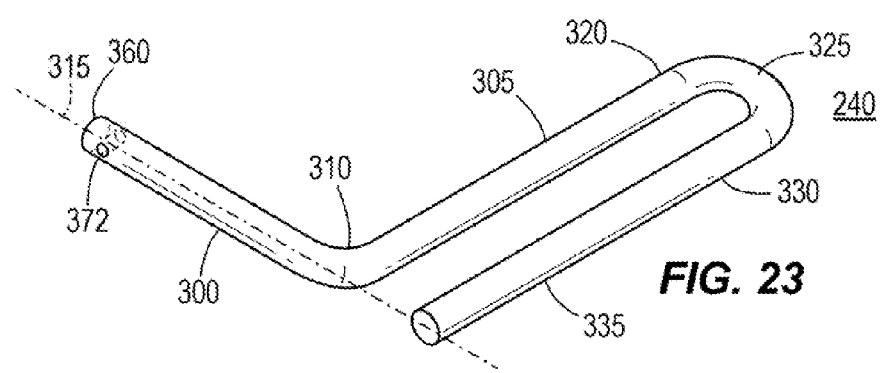

FIG. 22 and FIG. 23 are perspective views of two different but functionally equivalent embodiments of a substantially L-shaped pinch bar 240 used in the preferred embodiments of the valve 210. The pinch bar 240 shown in FIG. 22 has a rectangular cross section; the pinch bar 240 in FIG. 24 has a circular cross section. Regardless of the shape of the cross section, the pinch bar 240 is preferably formed by bending a solid bar of a ferrous material such as steel, around a first mandrel (not shown) to form two orthogonal legs. The first leg is identified in the figures by reference numeral 300; the second leg is identified by reference numeral 305.

The first leg 300 and the second leg 305 have corresponding lengths. The length of each leg can be measured from an imaginary intersection point 310 of the two orthogonal legs. The intersection point 310 of the two legs 300 and 305 is a point around which a bar of material is bent around a mandrel by which the two legs 300 and 305 are formed.

Regardless of the cross sectional shape of the bar from which the pinch bar 240 is made, the first leg 300 has a geometric axis of rotation 315 around which the first leg 300 can rotate. The cross sectional shapes and dimensions of the first leg 300 of each embodiment of the pinch bar 240 shown in FIGS. 22 and 23 and the diameter of the hole 270 are selected to permit the first leg 300 to rotate around its axis of rotation 315, inside the hole 270 formed through the valve body 230. The axis of rotation 315 of the first leg 300 is therefore substantially co-linear with the center line of the hole 270 formed into the valve body 230 and preferably orthogonal or nearly orthogonal to the front face 245 of the valve body 230.

Rotation of the first leg 300 around its axis of rotation 315 in the hole 270 rotates the second leg 305 through a corresponding angle measured around the axis of rotation 315. The L-shaped pinch bar 240, and, of course, the second leg 305, can thus be rotated in the hole 270 and around the axis of rotation 315 by rotating either the first leg 300 or the second leg 305.

The second leg 305 has a first end considered to be located at or near the intersection point 310 of the two legs 300 and 305. The second leg 305 has a second end 320 located away from the intersection 310.

In an embodiment, the bar from which the pinch bar 240 is formed, is bent again at or near the second end 320 of the second leg 305 in order to provide a substantially U-shaped portion 325. The U-shaped portion 325 of the second leg 305 may bend the second leg portion of the pinch bar 240 back upon itself to provide a substantially J-shaped handle 330 for a user to grasp. The J-shaped handle 330 for the pinch bar 240 is comprised of the U-shaped portion 325 and a relatively long handle portion 335. The long portion 335 of the J-shaped handle 330 is preferably formed to be substantially parallel to the second leg 305. The separation space between the second leg 305 and the linear portion 335 of the J-shaped handle 330 is defined by the width of the U-shaped portion 325. The separation space is preferably selected to be wide enough to allow at least one finger of an operator to fit into the J-shaped handle 330 so that an operator can grasp the J-shaped handle 330 and pull the pinch bar 240 forwardly, i.e., out of the hole 270 and away from the first side 245 of the valve body 230.

Figure 24:
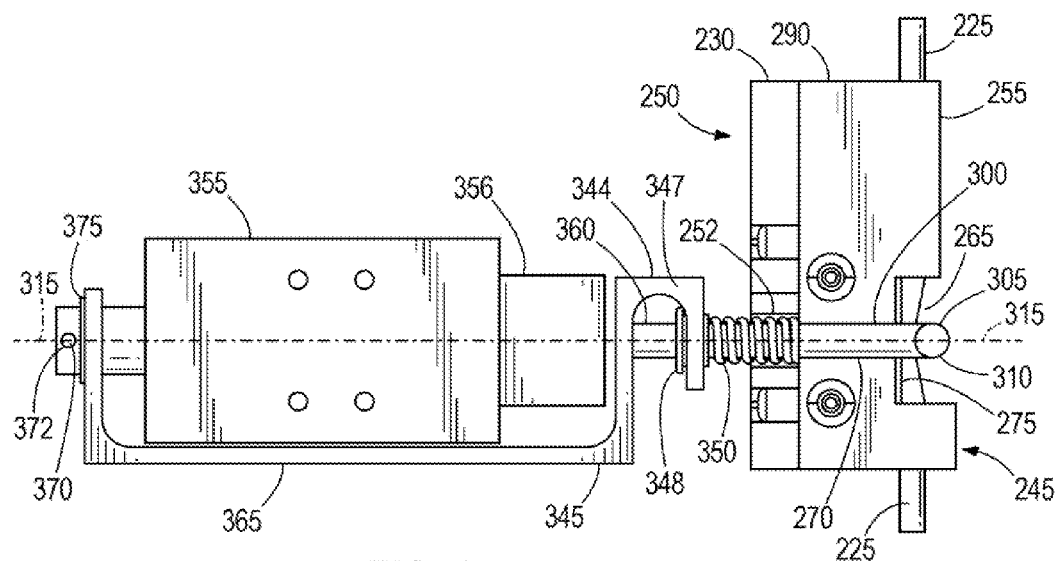
FIG. 24 is a side view of the pinch valve shown in FIG. 21 in the closed position.

FIG. 24 is a side elevation view of the valve 210 shown in a closed position, i.e., with the tube 225 pinched. The valve 210 is constructed to have a coil spring 350 that fits partway inside a blind hole 252 formed into the rear side 250 of the valve body 230. The valve 210 exerts a force against the vertical face 347 of a top portion 344 of a bracket 345 having a shape reminiscent of the letter "S" laid sideways.

The first leg 300 of the pinch bar 240 passes through the hole 270 formed into the valve body 230, through the spring 350 and through a hole (not visible) formed into the vertical face 347 of the top portion 344. The end of the first leg 300 that projects through the vertical portion 347 is fixed to the vertical portion 347 by a clip, such as a dished internal tooth lock washer 348 or equivalent.

The length and diameter of the spring 350 are selected such that the spring 350 biases the bracket 345 away from the rear 250 of the valve body 230. Since the first leg 300 is attached to the bracket 345, movement of the bracket 345 away from the valve body 230 by the force provided by the spring 350 pulls the second leg 305 into the tube 225, pinching it closed. The valve 210 is thus normally closed and is opened by moving the second leg 305 of the pinch bar 240 away from the front of the valve body and toward a user.

A solenoid 355 is attached to brackets, which are not shown in the figures for clarity but which fix the solenoid in space, relative to the valve body 230. The solenoid 355 includes a winding, not shown, through which a current flows to generate an electromagnetic field in a ferromagnetic core 356. The orientation of the magnetic field provided by the solenoid can be changed by the direction of current flowing through the winding. Since the valve is normally closed, the current flow through the solenoid is selected such that when current flows through the solenoid, it creates an electromagnetic field that will drive the bracket 345 toward the valve body 230 as can be seen in FIG. 25.

Figure 25:
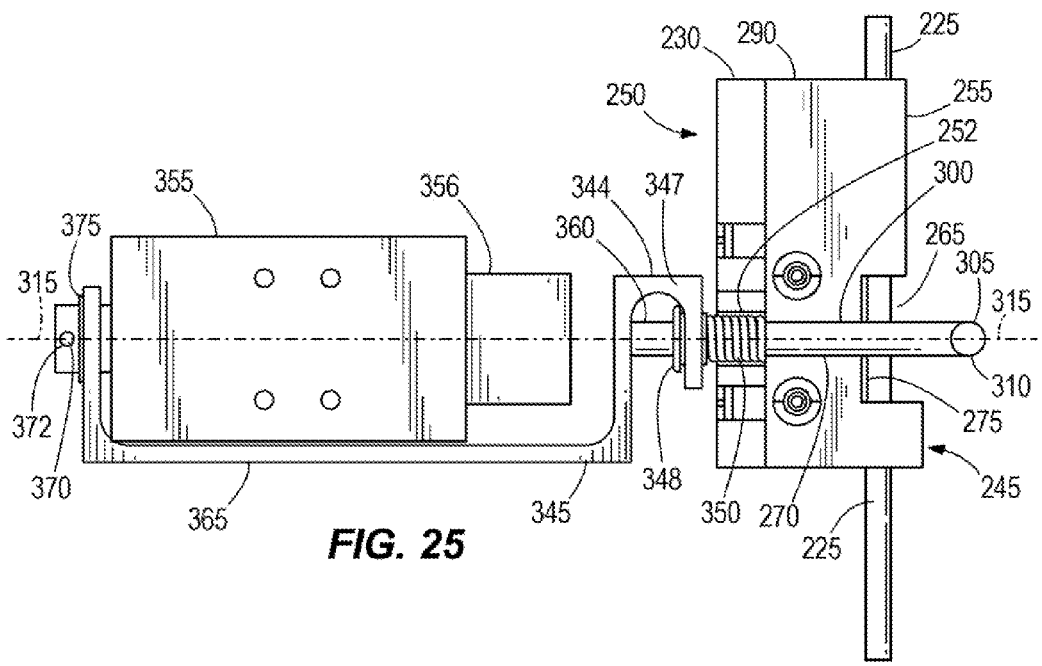
FIG. 25 is another side view of the pinch valve in an open position.

FIG. 25 is also a side view of the valve 210. The spring 350 is shown as being compressed by the vertical face 347 of the top portion 345, into the blind hole 252. The second leg 305 of the pinch bar 240 is shown as being away from the front side of the valve body 230.

The spring 350 maintains a force on the first leg that biases the valve 210 to be closed. The force provided by the spring 350 is great enough to compress (pinch) the tube 225 but not so great that the pinch valve 210 manually opened. The J-shaped handle 330 portion of the pinch valve 240 is configured to allow a user to grasp the handle portion 330 and overcome the force of the bias spring 350.

In a first position for the pinch bar 240 shown in FIGS. 21 and 25, the first leg 300 of the pinch bar 240 is forced leftward as shown in the figures. The second leg 305 of the pinch bar 240 is thus pulled toward the first side 245 of the valve body, as shown in FIGS. 21 and 24. In a second position of the pinch bar 240, which is shown in FIGS. 25 and 26, the first leg 300 is driven rightward in the figures, i.e., toward the valve body, which causes the second leg 305 to move away from the first side 245 of the valve body. Moving the second leg 305 away from the valve body 230 un-pinches the tube 225. The displacement of the first leg 300 between the first and second positions thus causes the second leg 305 to translate between third and fourth positions that are with respect to the front face 245 of the valve body 230. While the third and fourth positions of the second leg 305 are relative to the first side 245 of the valve body 230, but the distance separating them corresponds to the linear displacement of the first leg 300 in the hole 270 when the first leg travels between the first and second positions responsive to electric current passing through the solenoid 355.

FIG. 26 is a perspective view of the valve 210 viewed from the left front. The figure shows the pinch bar 240 with the second leg 305 in the fourth position. Fluid from a reservoir, such as a bulk dairy container in the dispenser shown in FIG. 20, can flow through the tube 225 as long as the pinch bar is held away from the valve body as shown in FIG. 26.

An important feature of the pinch valve 210 disclosed herein is its ability to facilitate removal and/or installation of a tube 225 in the valve 210 and hence, the removal and/or installation of a bulk liquid container inside a liquid dispenser 205. Removal and/or installation of a tube 225 in the valve 210 is facilitated by the ability of the pinch bar 240 to rotate around the axis 315 of the first leg 300, regardless of whether the second leg 305 is in the third or fourth positions. FIG. 27 is a perspective view of the pinch valve 210 showing the pinch bar 240 in two, different angular positions, relative to the axis of rotation 315 of the first leg 300. FIG. 27 also shows that the pinch bar 240 can be rotated such that the second leg 305 can be rotated from a horizontal orientation to a vertical orientation and vice versa.

In FIG. 27, phantom lines are used to depict the second leg 305 and J-shaped handle 330 as being substantially horizontal. The pinch bar 240 and its various sections can thus be characterized as lying in a first plane, which as depicted in FIG. 27 is substantially horizontal.

The second leg 305 is shown in phantom lines as extending sideways, i.e., laterally away from the point of intersection 315 of the two legs, and away from the hole 270. The length of the second leg 305 is such that the second leg 305 extends sideways over the substantially planar first part 275 of the dispensing tube alignment block 235.

FIG. 27 also shows the second leg 305 of the pinch bar 240 and the J-shaped handle 330, in solid lines in order to depict them after being rotated counter-clockwise approximately ninety (90) degrees around the axis of rotation 315. The rotated pinch bar 240 and its various sections can be characterized as lying in a second plane, which is shown exemplarily in FIG. 27 as being substantially vertical but also substantially orthogonal to the first plane. When the pinch bar 240 and its various sections are oriented as shown in FIG. 27, a dispensing tube 225 can be easily placed into or removed from the first and second U-shaped channels 280 and 285 of the thermally conductive dispensing tube alignment block 235.

Pinch bar rotation around the axis 315 to facilitate the removal and/or installation of a tube 225 is enabled in part by how the first leg 300 is attached to the solenoid. As shown in FIG. 25, the distal end 360 of the first leg 300 extends through a hole (not visible) in the bottom face 365 closest to the valve body of the S-shaped bracket solenoid 355. A dowel pin 370 extends through a small hole (not visible) formed into the first leg 300 near distal end 360. The dowel 270 rides over a washer or gasket 375 on the outside surface of the S-shaped bracket face 365 as the first leg 300 rotates around the axis of rotation 315. A rotatable coupling is thus provided by the hole in the bottom face 365 of the S-shaped bracket, the pin 370 and washer 375 enables the pinch bar 240 to freely rotate in the hole 270 formed in the valve body 230.

It is also important to note that pinch bar rotation is also facilitated in part by the dispensing tube alignment block 235. The upper U-shaped channel 280 of the block 235 has two sides 380 and 385 separated from each other by the U-shaped channel 280.

FIG. 26 and FIG. 27 show that the right side 385 of the upper U-shaped channel 280 has beveled edge, which is identified by reference numeral 390. When the second leg 305 of the pinch bar 240 is rotated counterclockwise around the axis of rotation 315, the second leg 305 runs over the beveled edge 390 and is thus levered away from the first side 245 of the valve body by the beveled edge 390. The beveled edge 390 thus effectively levers or "lifts" the second leg 305 away from the first side 245 of the valve body 230 and away from the planar surface 275 and onto the stop-block 290. In the process, the rotation of the pinch bar 240 releases the compressive forces on the tube 225 against the valve surface 275, thus opening the tube 225. Rotation of the pinch bar in the other direction from the stop-block 290 applies the compressive force on the tube 225 against the valve surface 275 to close the tube 225. A resting notch 295 formed in the left side, L, of the front face of the stop-block 290 provides a detent that holds the pinch bar 240 upright. Rotating the pinch bar 240 around its axis of rotation 315 thus allows a tube 225 to be removed from the dispensing tube alignment block 235 as happens when a bulk liquid container is removed and replaced.

It is important to note that the dispensing tube alignment block 235 is preferably made from a thermally conductive material such as aluminum. In a preferred embodiment, the aluminum dispensing tube alignment block 235 is sized, shaped, and arranged to extend upwardly and into thermal communication with refrigerated portions of the cabinet 205. The top end of the dispensing tube alignment block 235 is thus chilled, which enables the block 235 to act as a heat sink for the tube 225 and fluid therein. The J-shaped handle 330 of the pinch bar 240, the first leg 300, the hole 270 and the solenoid are cooperatively sized, shaped and arranged as described herein such that a user of the cabinet 205 can fit one or more fingers within the J-shaped handle 330. A user can thus draw (pull) the pinch bar 240 away from the first side 245 of the valve body 230. Pulling the pinch bar 240 away from the first side 245 by at least the distance that corresponds to the different thickness of the left-hand side of the valve body 230, from the right-hand side of the valve body 230 allows a user to simultaneously rotate the second leg 305 into the detent/notch 265. The pinch bar can be re-positioned back to its operating position simply by grasping the J-shaped handle, pulling it away from the first side 245 of the valve body and rotating it clockwise.

In the preferred embodiment, a user can select a particular volume of liquid to dispense by actuating one or more push button switches 35 affixed to the front panel 55 of the lower compartment 25. Wires 60 connect the switches 35 to the computer 30 located in the lower compartment 25. Switch closures are detected by the computer 30. Each switch requests the computer to dispense a different volume. The particular volume selected by the various switches is a design choice. In one embodiment, the software in the computer memory is written to interpret multiple switch closures, whether they are made serially or in parallel, as requests for multiple volumes. By way of example, actuation of a 1-ounce switch informs the computer 30 that one ounce is requested by a user. Actuation of a 1-ounce switch followed immediately by actuation of a 3-ounce switch, or simultaneously with the 3-ounce switch, is construed by the computer as a user-request for the delivery of four ounces.

Switch closures and electrical signals input to the computer 30 from one or more detectors/sensors described below enable the computer 30 to calculate a time required to open the dispensing valve 40 to dispense a requested volume. The valve open time is determined using a requested volume and a real-time, direct measurement of the liquid in a container 50. Except for manually-dispensed volumes which require an operator to manually open the pinch valve, the valve open time for each requested amount of liquid to be dispensed under software control is considered herein to be determined empirically. An empirical determination is considered to be a determination that is made using sensing of the actual amount of liquid in the tank, or the actual level of the liquid in the tank, just before the liquid is actually dispensed. Unlike prior art devices, the valve open time is not determined by counting or accumulating volumes that have been previously dispensed. The valve open time required to dispense a particular volume of liquid is determined empirically prior to each opening of the pinch valve.

Figure 2:
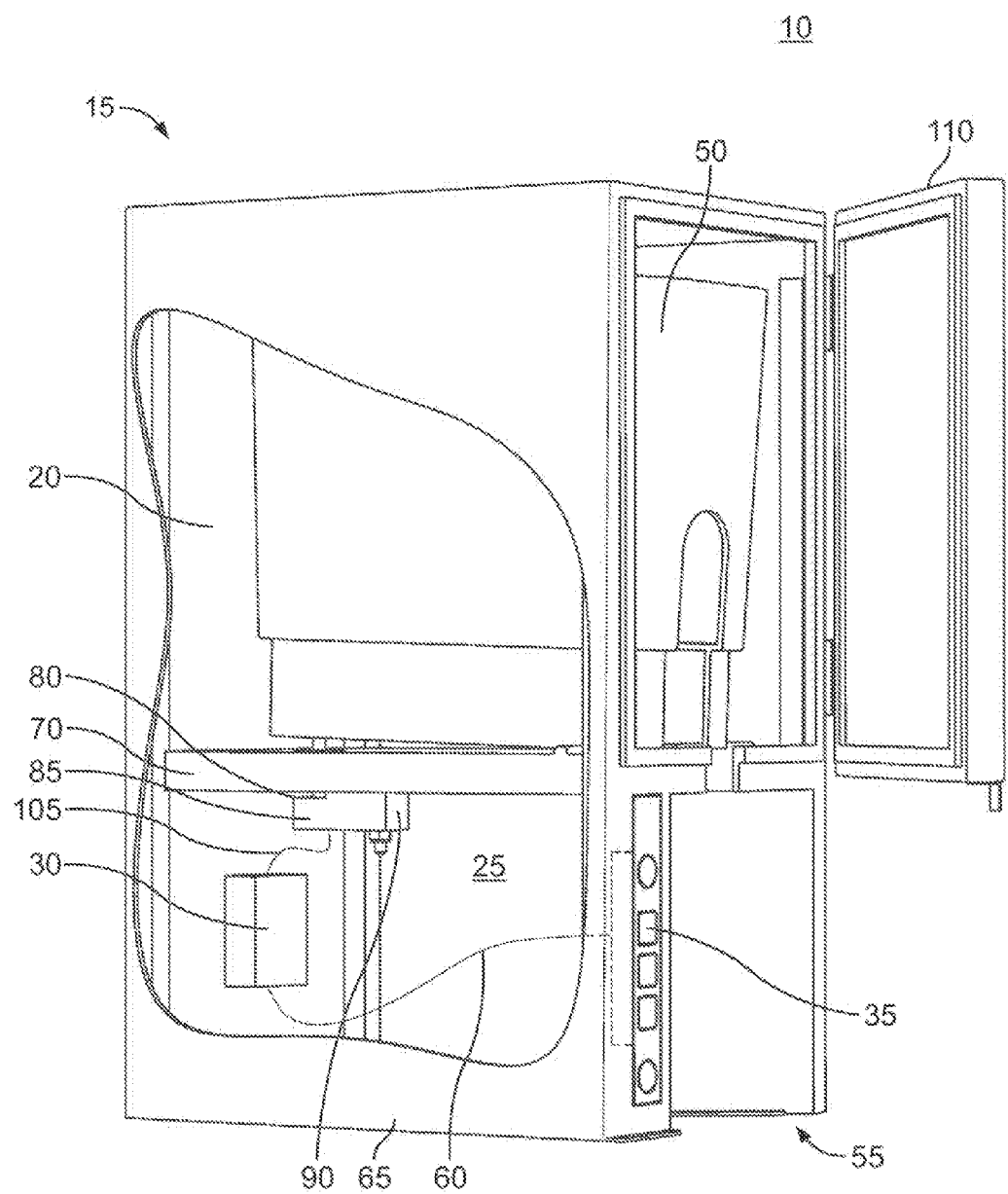
FIG. 2 is a partial cut-a-way of the dispenser shown in FIG. 1.
Figure 3:
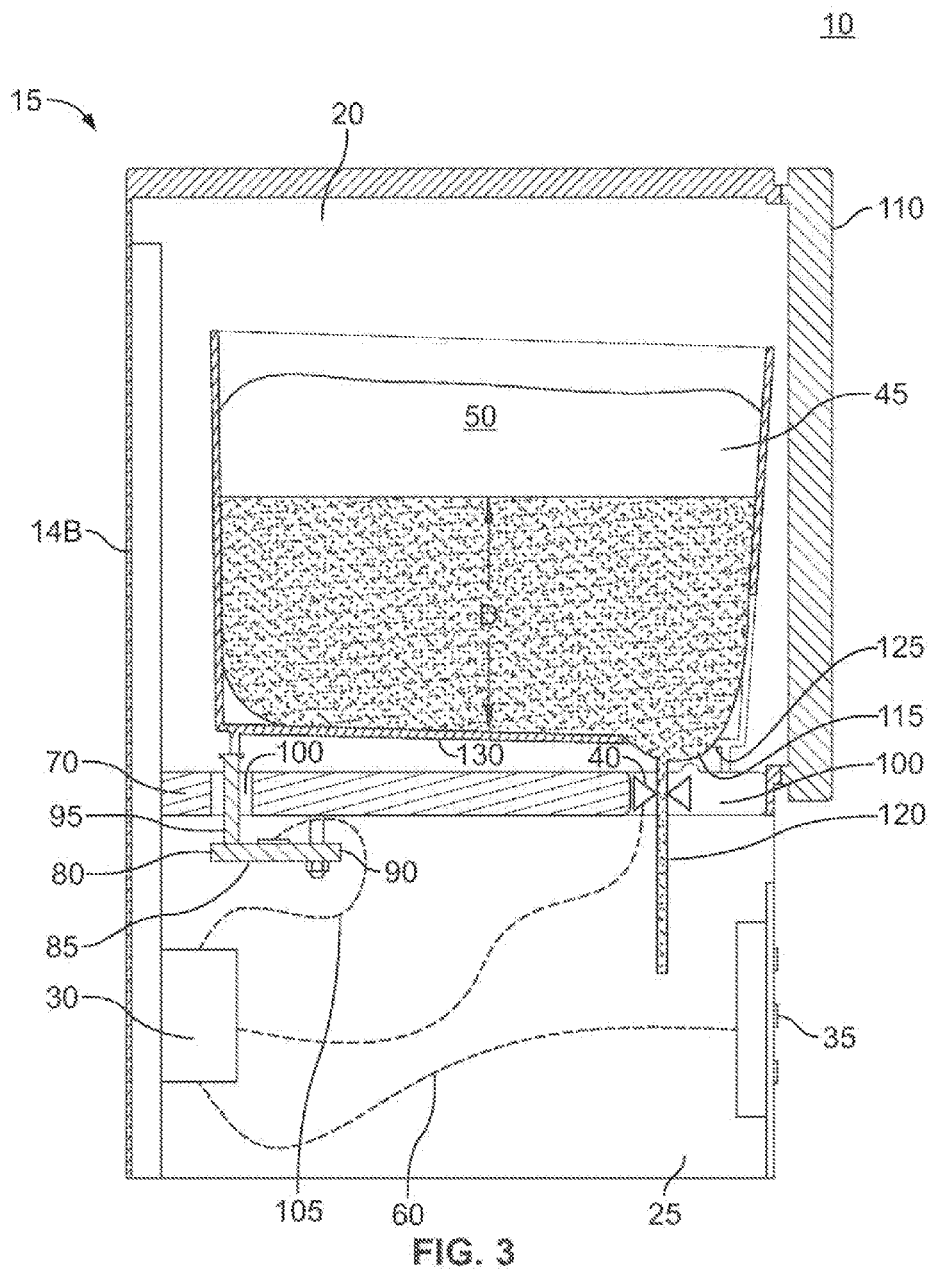
FIG. 3 is a cross sectional view of the dispenser shown in FIG. 1.
Figure 4:
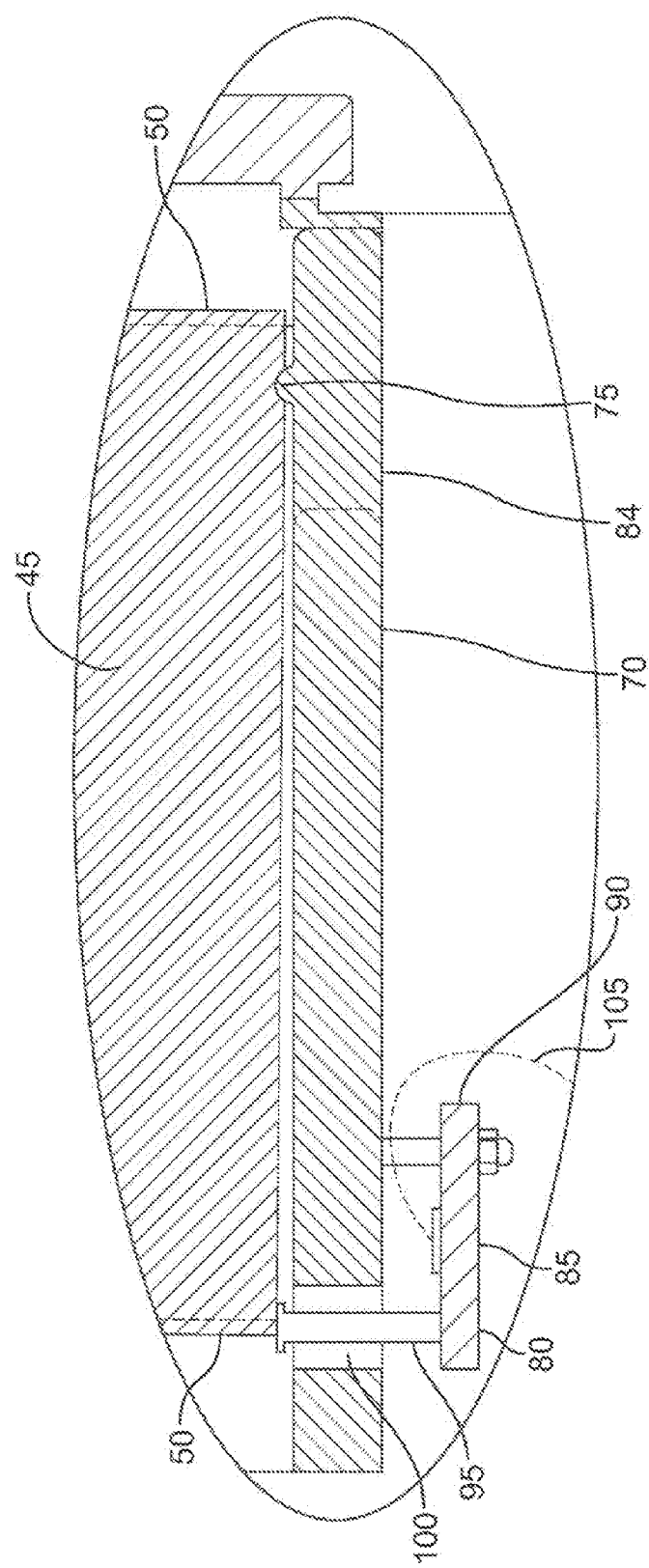
FIG. 4 is an isolated view of a load cell supporting part of a container in the dispenser shown in FIGS. 1-3.

FIG. 2 is a partial cut-away view of the left side of the liquid dispensing apparatus 10 shown in FIG. 1. FIG. 3 is a cross-sectional view of the cabinet viewed from the left-hand side 65 of the cabinet 15. FIG. 3 also depicts one embodiment of a container 50 that holds liquids and which is formed of a rigid plastic. FIG. 4 is an isolated view of the apparatus 10 showing in cross section, details of a shelf 70 that defines the upper 20 and lower 25 compartments. FIG. 4 shows how the front end of the container 50 pivots on a fulcrum or ridge 75 that extends into and out of the plane of the figure and which rises upwardly from the top surface of the shelf 70. FIG. 4 also shows how the back end of the container 50 is supported on one end 80 of a load cell 85 that is cantilevered from an opposite end 90 by a bolt driven into the underside of the shelf 70.

The front end of the container 50 rests on the fulcrum 75 formed into the top surface of the shelf 70. The container 50 is thus able to pivot over the fulcrum 75.

The back or rear end of the container 50 rests on an elongated, upright post 95 that extends downwardly from the underside of the container 50, through a hole 100 formed in the shelf 70, onto the cantilevered end 80 of the load cell 85. Since the fulcrum 75 supports part of the container's weight, only a portion of the containers weight is supported by the fulcrum 75. The rest of the container's weight is supported by the second end 80 of the load cell 85.

The portion of the container's weight that is impressed on the load cell 85 causes the load cell 85 to deflect. Load cell deflection changes the electrical resistance of a Wheatstone bridge circuit that is attached to the load cell 85. Since the load cell 85 deflection is proportional to the weight impressed on the load cell by the container 50 and its contents, the signal "output" from the load cell 85, and which is sent to the computer 30 via the connection wires 105, represents at least a fractional amount of liquid in the container 50.

In an alternate embodiment, the entire weight of the container and its contents is supported by one load cell. In one such alternate embodiment, a load cell is located above the center of mass for the container and its contents. A hook is attached to load end of the load cell. A liquid container is suspended from the load cell. The entire weight of the container and its contents is thus measured. Other embodiments use two or more load cells, with each load cell supporting a fractional portion of the container. One embodiment uses four load cells at each corner of the container 50 or at each corner of the cabinet 15. In multiple-load cell embodiments, the outputs of the various load cells are summed by the computer 30 and provide a fairly accurate measurement of the entire weight of the container and/or cabinet 15.

A hinged door 110 provides access to the interior of the upper compartment 20 and to the lower compartment 25. In one embodiment depicted in FIG. 3, the container 50 is a rigid bin or basin, which holds a flexible bag 115, and which contains the liquid 45 to be dispensed. The bag 115 is formed with an integral liquid dispensing tube 120. The dispensing tube 120 extends from the bag 115 through a hole 125 in the bottom 130 of the container 50, through a passage 101 formed into the shelf and through the pinch valve 40. Wires connect the pinch valve 40 to the computer 30. Plastic bags containing liquid to be dispensed can be placed into the container and removed from the container via the door 110.

To dispense a fixed volume of liquid, a signal from the computer 30 instructs a solenoid controlling the valve 40 to open, i.e., "unpinch," the tube 120 by actuating the pinch valve to air open position. Opening the pinch valve allows liquid to run out of the container through the tube. The tube 120 is kept unpinched by the computer 30 for a time period that is only long enough to dispense the volume of liquid that was requested by a use at the push button switches 35. When the time required to keep the valve open has elapsed, the pinch valve is closed. In a preferred embodiment, the pinch valve is biased by a spring to be normally closed. The signal from the computer 30 to the valve solenoid thus holds the valve 40 open against the spring. Closing the valve simply requires the valve open signal from the computer to be shut off.

The time that the valve must be held open to dispense a particular volume of liquid requested by operation of one or more switches essentially depends on the pressure of the liquid at the valve 40, just before the valve is opened. The pressure of the liquid 45 on the valve 40 depends on the depth of the liquid 45 above the valve 40. In the figures, the depth of the liquid 40 above the bottom 130 of the container storing the liquid to be dispensed is denoted by the letter D. A relatively short but nevertheless additional column of liquid exists in the tube that is between the bottom of the container and the pinch valve 40.

In the preferred embodiment, the depth D of the liquid in the tank or container 50 is determined from a weight measured by the load cell 85. As is well known, a load cell is essentially a strain gauge in combination with a resistive circuit well known to those of ordinary skill in the electrical arts as a Wheatstone bridge circuit. When the load cell deforms in response to an applied force, the electrical characteristics of the Wheatstone bridge circuit change. The electrical characteristics of the Wheatstone bridge can thus be correlated to a weight supported by the load cell 85. If the density of the liquid is known, and if the geometry of the container is known, the depth of the liquid in a container can be derived from the weight of the container and contents, or from just the weight of the liquid in the container.

Figure 19:
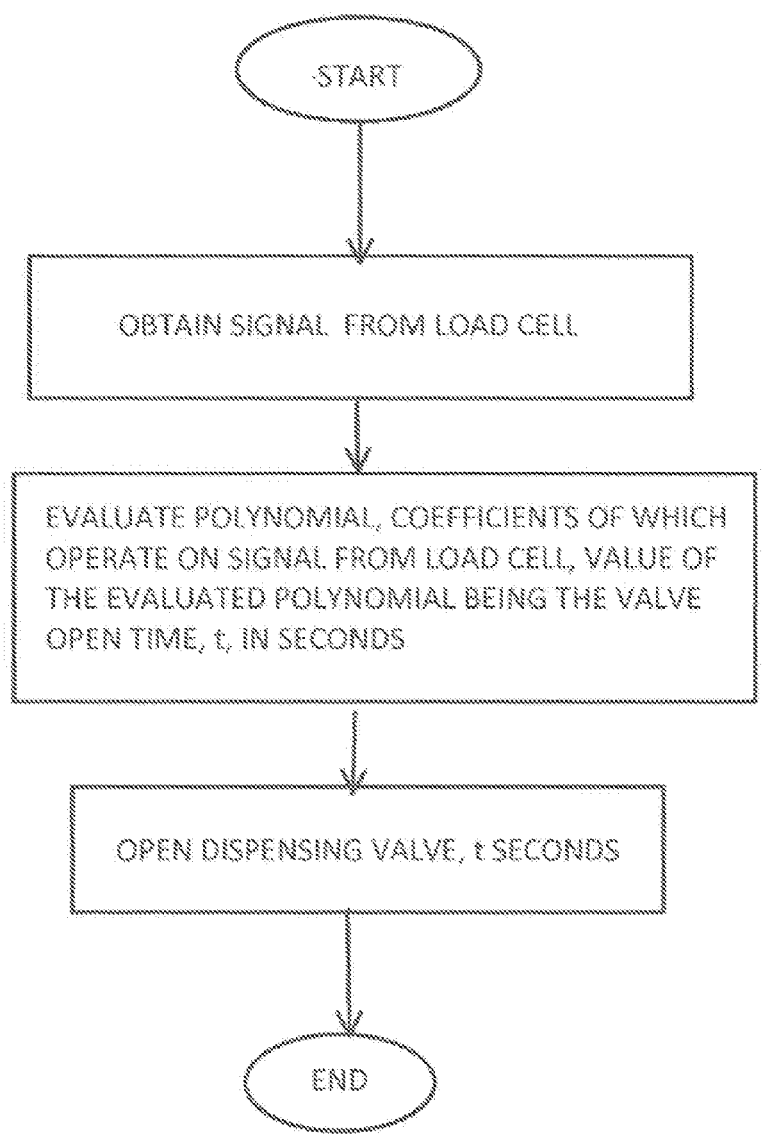
FIG. 19 is a flow chart depicting steps of a method to dispense a volume of liquid.

In the preferred embodiment, the time that the valve must be kept open to dispense a user-requested volume of liquid is determined by evaluating a polynomial that effectively correlates a signal obtained from the load cell 85 to the time required to open the valve 40 to dispense a requested volume. See FIG. 19. In the preferred embodiment, the polynomial was experimentally determined to be of the form:

$$y = Ax^3 + Bx^2 + Cx + K$$

where A, B and C are coefficients and K is a constant;
x is the load cell output signal and
y is the valve open time in seconds.

In tests of a prototype liquid dispenser having one end of the container 50 supported on a fulcrum 75 and the opposite end supported by a load cell 85 essentially as shown in FIG. 3 and using a pinch valve as described in the aforementioned co-pending application, the coefficients required to dispense one ounce of liquid from the container were determined to be: A=−0.0012, B=0.0207, C=−0.1444 and K=0.89.

Figure 5:
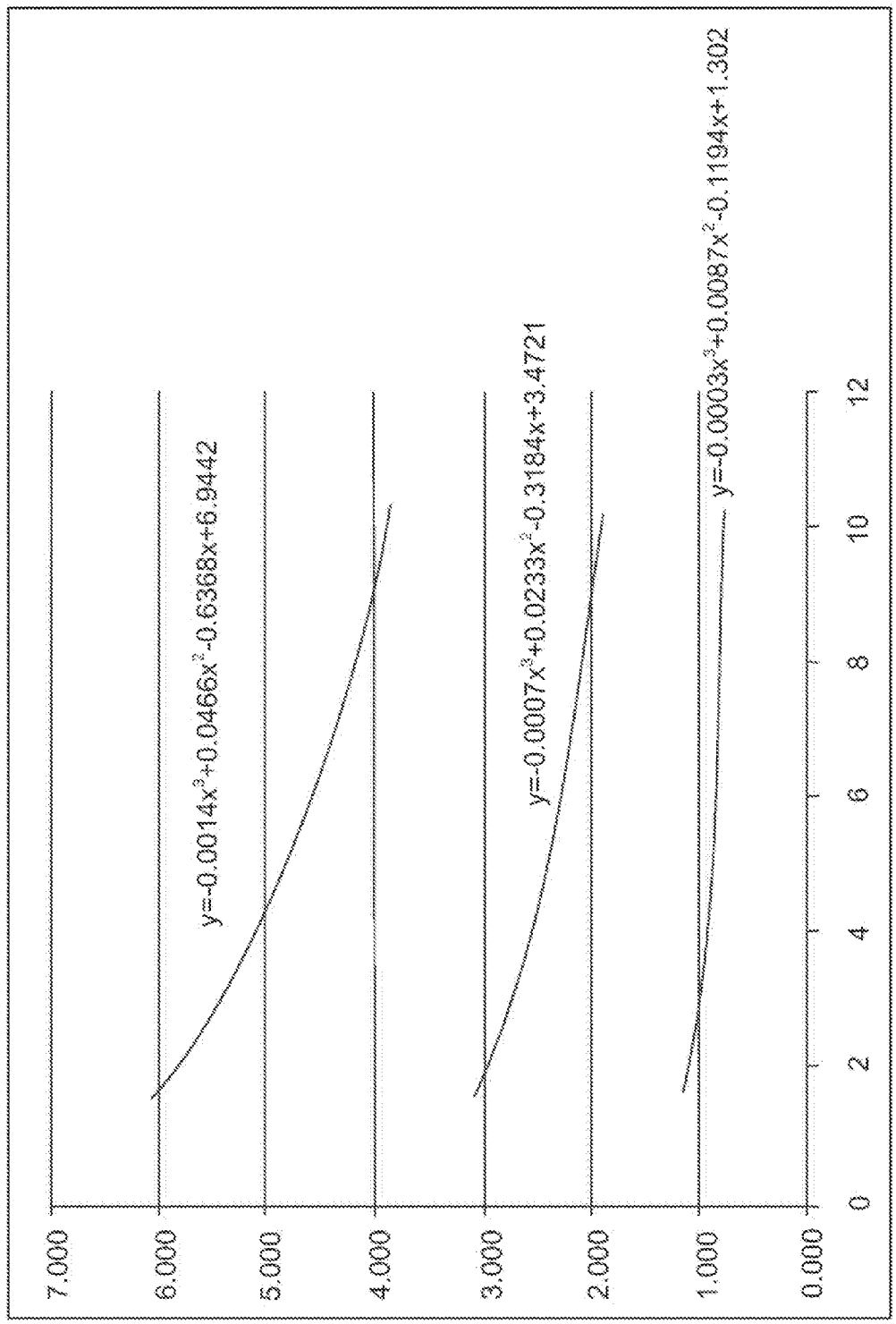
FIG. 5 is a graph depicting plots of different polynomial functions that model experimentally-determined valve open times as a function of liquid level and a user-requested volume, for the dispenser shown in FIG. 13.

FIG. 5 depicts plots of a third-order polynomial for three different requested volumes from the prototype described above. Values along the x axis are different outputs from the load cell, typically a D.C. voltage. The y-axis is the time in seconds required for the valve to be kept open in order to dispense a volume of liquid represented by each curve.

Each curve in FIG. 5 is the plot of a polynomial for a different requested volume. The lowest curve is a plot of the polynomial that determines the valve open time for a first volume of liquid. The middle curve is a plot of the polynomial that determines the valve open time required to dispense a second volume of liquid, greater than the first volume. The top curve is a plot of the polynomial that determines the valve open time required to dispense a third volume of liquid, greater than the second volume. The three polynomials have different coefficients.

The polynomial that models the required valve open time was determined experimentally by measuring volumes of liquid dispensed through a pinch valve when the pinch valve was kept open for a given length of time, with different measured weights of liquid in the container, i.e., with differing liquid heights. The polynomial thus works to determine valve open times required to dispense a volume of liquid from a particular type of container, namely the one shown in FIGS. 1-3 and having a particular size, a particular discharge tube, having particular characteristics, e.g., length and inside diameter. The polynomial, which is determined experimentally, correlates a measured weight of the container and liquid to a required valve open time, regardless of the container's shape. Using a different container and/or discharge tube requires different polynomials and/or constant to be determined, preferably by curve fitting, as was done in the preferred embodiment.

In another alternate embodiment, which avoids computing a polynomial, the computer 30 reads or is otherwise provided with a load cell output voltage. The output voltage is used as a pointer into a table, typically stored in RAM, EEPROM, ROM or other computer memory device, from which the computer 30 can read an amount of time required to hold the valve open. If the load cell outputs a voltage that is not in the table, e.g., 7.02 volts, software in the computer 30 rounds the value up or down, as a design choice, to the closest value in the table.

In FIGS. 17A-17F, the valve open times are listed in the right-hand column and are expressed in seconds of time required to hold the valve open in order to dispense one ounce of liquid. The valve open times in the right-band column were determined by evaluating the third order polynomial equation shown at the top of FIG. 17A and storing each resultant valve open time as a table with the corresponding load cell output vales. Dispensing volumes other than one ounce simply requires a corresponding, fraction or multiple of the 1-ounce valve open time to be used.

By way of example, and using FIG. 17A, if the load cell output voltage is 7.2 volts, the valve open time required to dispense one ounce of liquid from the dispenser 10 is 0.4755 seconds. The time required to dispense two ounces would be double the amount of time required to dispense one ounce, i.e., about 0.9510 seconds. The time required to dispense one half ounce would be one-half the 0.4755 seconds to dispense one ounce, i.e., about 0.2377 seconds.

Figure 18:
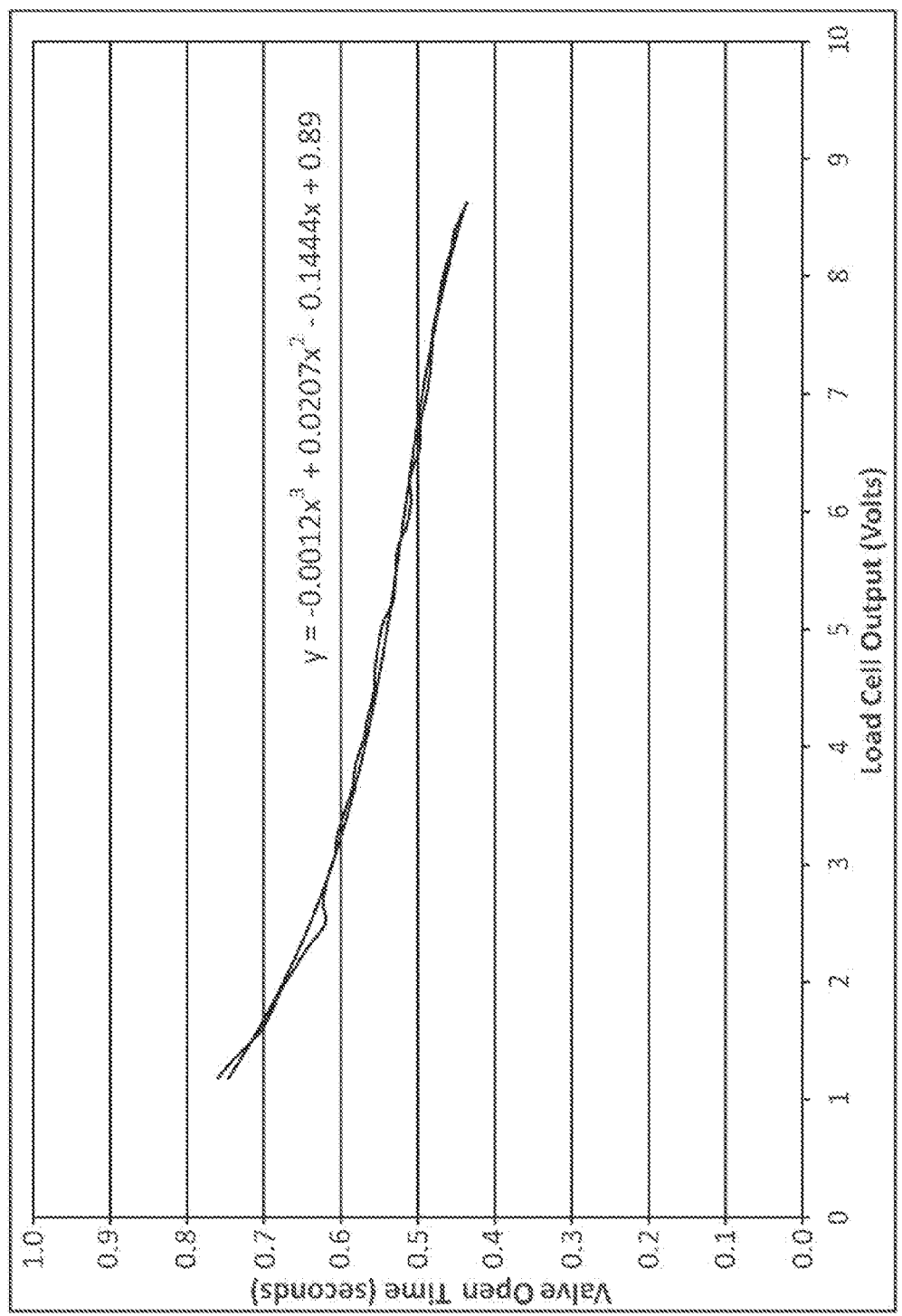
FIG. 18 is a plot of a third-order polynomial from which the table in FIGS. 17A-17E was generated.

FIG. 18 shows a plot of the polynomial from which the table in FIGS. 17A-17E was generated. The load cell output voltage decreases as the liquid in the container decreases. The valve open time, which is the time required to dispense one ounce of liquid, increases as the load cell output decreases in response to liquid being depleted from the container. Additional methods and apparatus for determining liquid in a tank are described below.

As mentioned above, the depth D of the liquid determines a static pressure at the valve 40. The static pressure at the valve 40 determines the flow rate of the liquid 45 through the valve 40. The flow rate of the liquid 45 through the valve 40 determines the time that the valve 40 must be held open to dispense a requested volume (or a requested weight of a liquid to be dispensed). The time required to hold the valve open to dispense a particular volume of liquid is therefore dependent on the amount of liquid in a container, prior to opening the valve 40 since the amount of liquid 45 in a particular container inherently determines the liquid's height therein. The experimentally determined polynomial described above is thus considered to be one that correlates an amount of liquid in a container to an amount of time required to hold the valve open to dispense a requested volume. Evaluating the polynomial thus inherently includes a determination of a depth of the liquid in the container. A valve open time is thus determined empirically, by evaluating the polynomial using for x, the signal output from the load cell prior to opening the valve and which corresponds to the weight supported by the load cell 85.

FIG. 4 shows in greater detail, how the load cell 85 is attached to the underside of the shelf 70 in the preferred embodiment to support at least part of the weight of the container 50, and how the front of the container 50 rests on a ridge or fulcrum 75. One end 90 of the load cell 85 is bolted to the underside of the shelf 70. A space is shown between the load cell 85 and the shelf 70 to illustrate that the load cell 85 is essentially cantilevered at the first end 90.

The second end 80 of the load cell 85 supports a vertical post 95. The post 95 extends upwardly from the second end 80 of the load cell 85, through a hole 100 in the shelf 70, and into engagement with the bottom of the container 50. The load cell 85 thus supports at least half the weight of the container 50. As the volume of liquid 45 in the container decreases, the force impressed on the load cell 85 will change accordingly, as will the output signal from the load cell 85. Each time that a volume is requested by a user, the instantaneous value of the load cell output signal is read by the computer 30 and used as an input value of x in the polynomial. Evaluation of the polynomial using appropriate coefficients will yield a value that is the amount of time that the valve should be held open to dispense the requested volume.

While the preferred embodiment determines the valve open time using a load cell, alternate methods of determining the valve open time are made by determining the actual height of the liquid 45 in a tank 50 prior to opening the valve. Various ways of detecting the depth of the liquid are depicted in FIGS. 6-16 and described below. The structures in FIGS. 6-16 that determine the depth of the liquid 45 in the tank or container 50 are different from each other yet functionally equivalent. Each is a different means for determining the depth of a liquid in a container.

Those of ordinary skill in the art ill recognize that if the weight of container 50 is known, weight of the liquid 45 inside the container 50 can be determined a straightforward subtraction of the container weight from the gross weight of the container and liquid combined. Knowing the weight of the liquid inside the container enables the volume of liquid to be determined using the density of the liquid. If the dimensions of the container 50 are known and if the volume inside the container is known, the depth of the liquid 45 inside the container can be determined from a straight-forward calculation. The depth of the liquid can therefore be determined directly from the signal front the load cell. The load cell implementation is thus an equivalent means for determining the depth of the liquid in the container, i.e., the liquid surface height inside the container.

Figure 6:
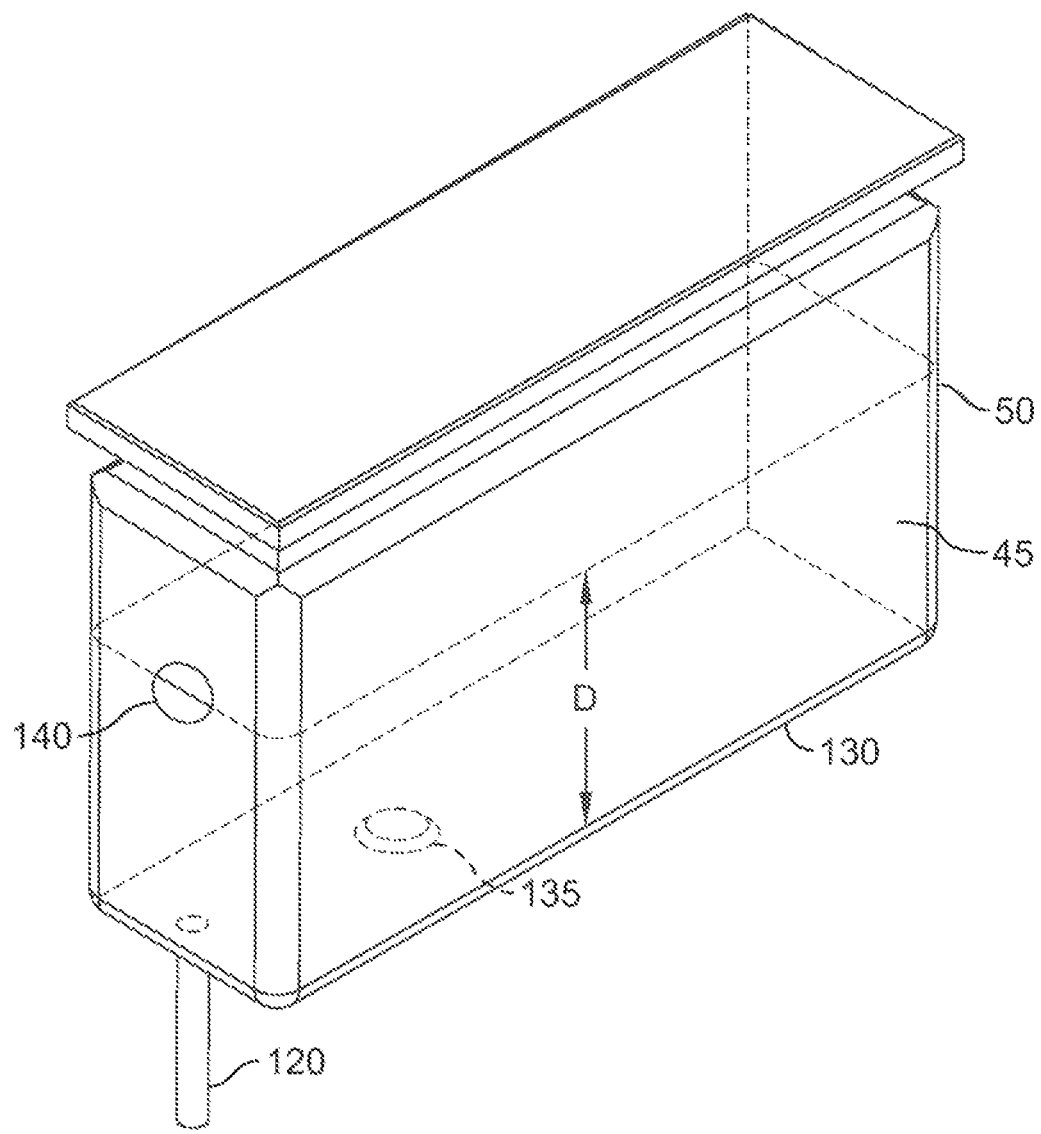
FIG. 6 is a perspective view of an alternate embodiment of a container for holding liquids to be dispensed and showing a different liquid sensor.

In FIG. 6, reference numeral 135 identities a static pressure sensor affixed to the bottom 130 of the tank 50. The diaphragm of the pressure sensor has one side exposed to the liquid and the other side is either a vacuum or atmosphere. In this case, the sensor does not have to be exposed to the outside of the container, i.e., through a hole in the bottom. It is a so called absolute sensor. Those or ordinary skill in the art will recognize that static pressure exerted on the sensor 135 will decrease as the depth D of the liquid 45 decreases. An optional sight glass 140 enables a user to peer into the tank 50 and inspect the contents thereof.

Figure 7:
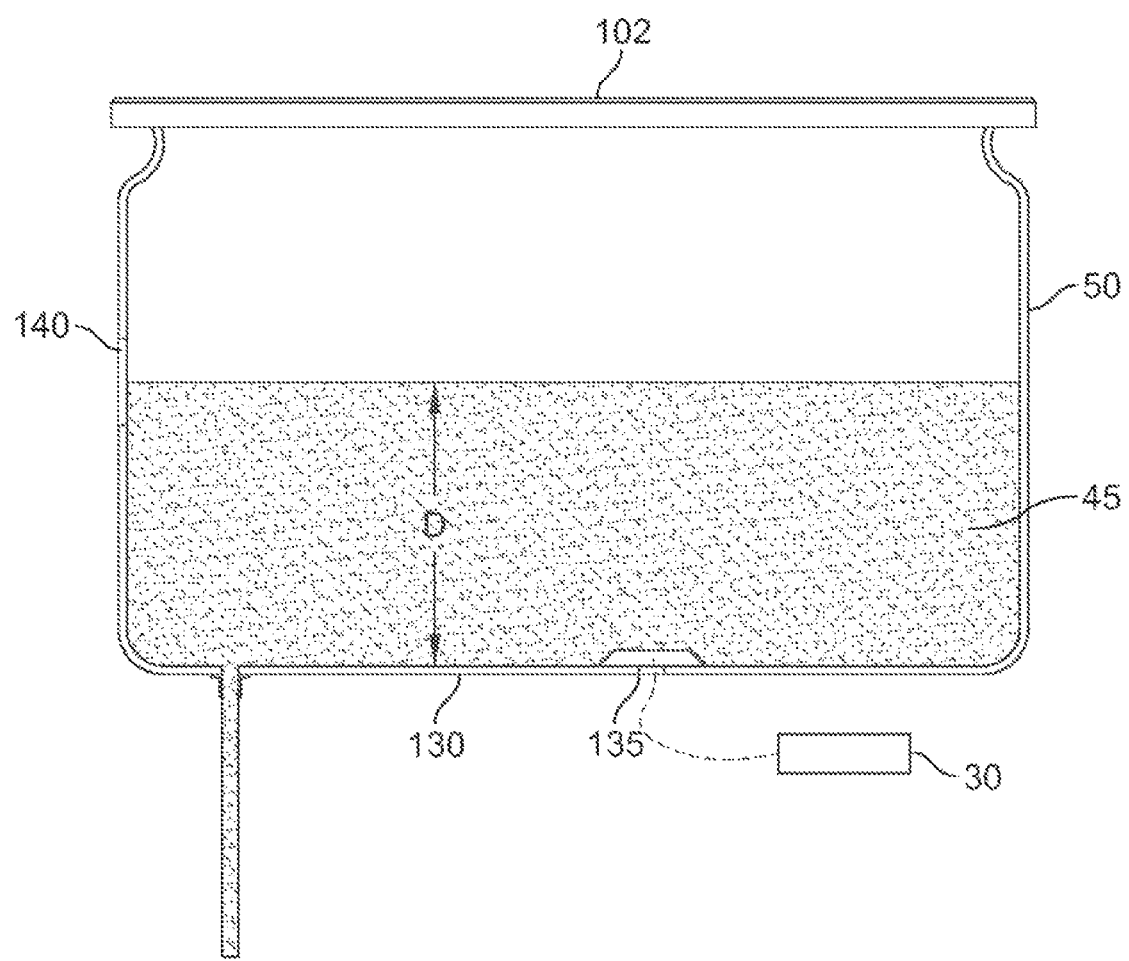
FIG. 7 is a cross sectional view of the container shown in FIG. 6 showing a pressure sensor.
Figure 11:
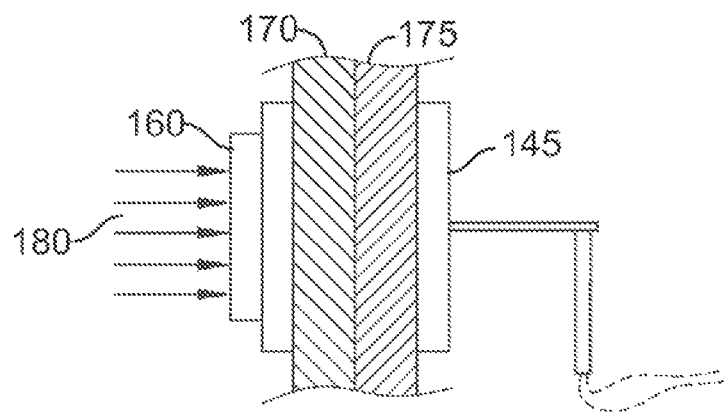
FIG. 11 is a cross sectional view of an optical liquid detector/sensor.

FIG. 7 is a side view of the pressure sensor 135 depicted in FIG. 11 is shown connected to the computer 30. Not shown in FIG. 6 are the pinch off valve 40, the user interface switches 35 and connections between the pinch-off valve 40 and switches 35 and the computer 30. These are also not shown in FIG. 7 for clarity.

Figure 8:
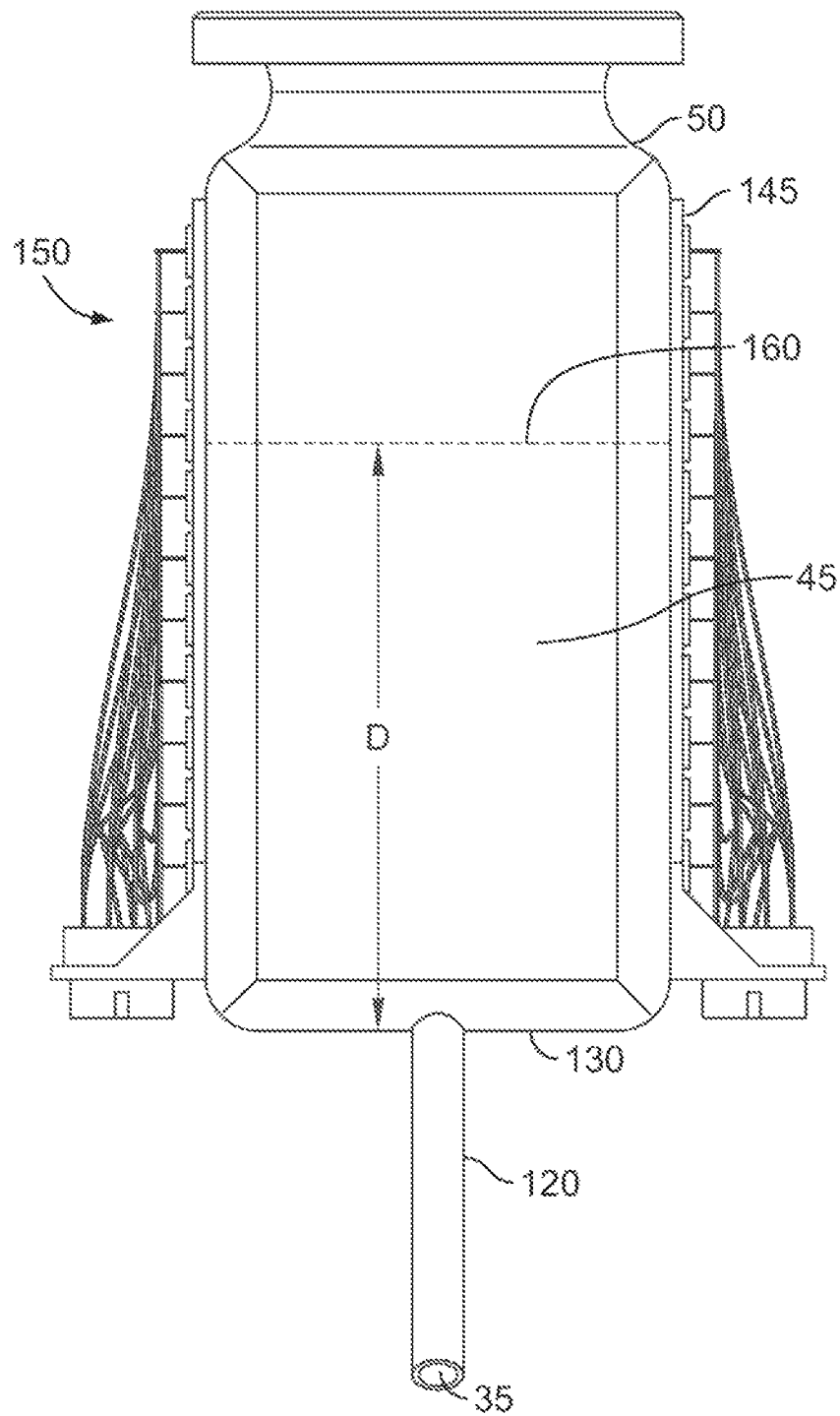
FIG. 8 is an end view of an alternate embodiment of the container shown in FIGS.
Figure 9:
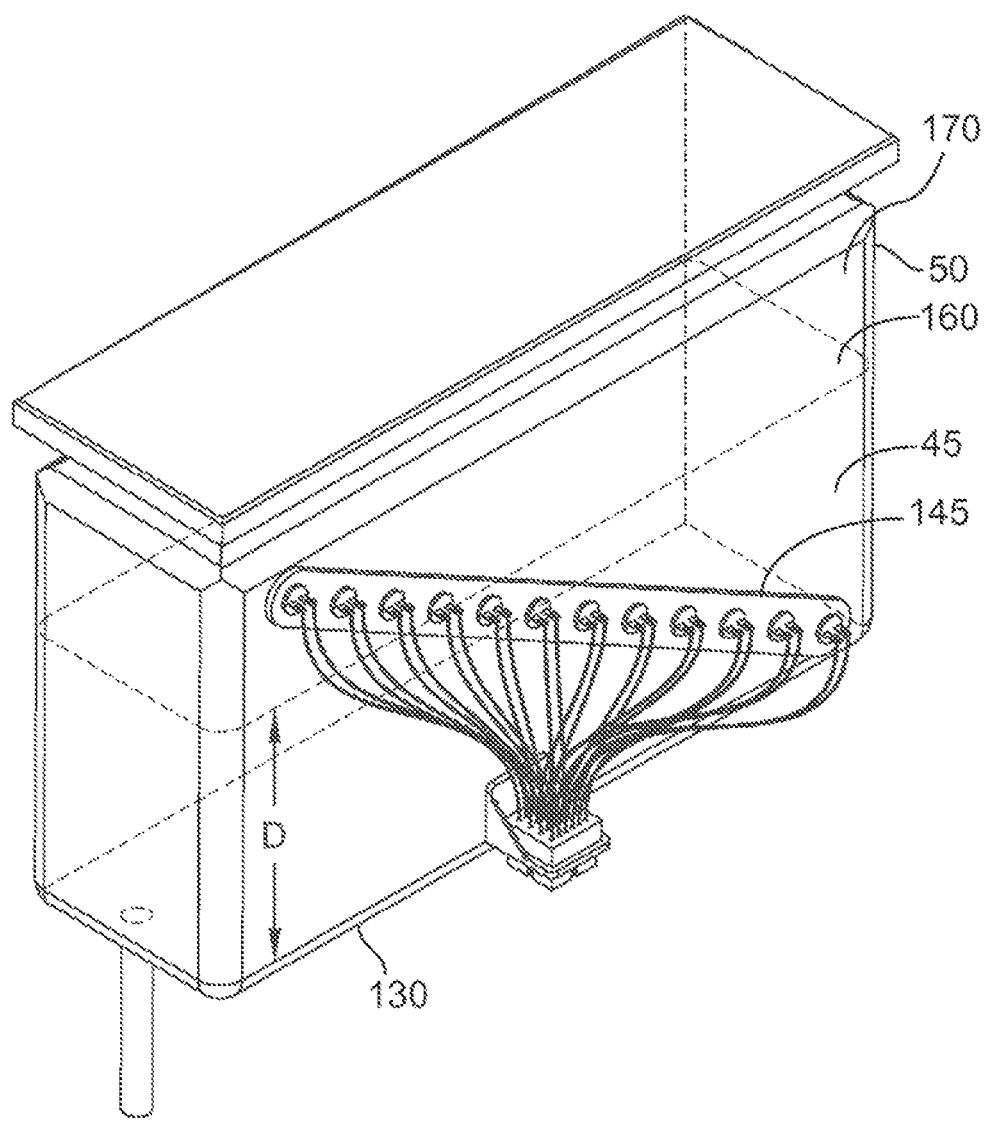
FIG. 9 is a perspective view of the right hand side of a container showing another embodiment of a liquid sensor.

FIG. 8 depicts an array of photo diodes 145, i.e., diodes that detect light and which output an electrical signal representative thereof and an array of light emitting diodes 150 on the opposite side of the container 50. The photodiodes 145 are shown in FIG. 9 as being coupled to the right-hand side 155 of the tank 50 and arranged along an inclined line. The photo diodes 145 are thus considered to be an inclined linear array, which permits diodes to be vertically closer to each other than might be possible if the photo diodes 145 were in a vertical array. The elevation of each photo diode 145 above the bottom 130 of the tank 50, is of course, known to the computer 30.

In one embodiment, the tank 50 is constructed of either translucent or at least partially-translucent material such as glass or Plexiglas. The array of photo diodes 145, which detect ambient light, is attached to one side of the container as shown in FIG. 9. If the liquid 45 in the container is opaque or at least partially opaque, voltage output front the photo diodes below the surface of the liquid, i.e., at elevations less than the height D of the liquid in the tank, will be zero or nearly zero. Voltage output from diodes 145 above the liquids surface, i.e., at an elevation above the height D, will be greater than zero or at least greater than the voltage output from diodes below the surface of the liquid. The level of the liquid can thus be determined, or at least estimated, by determining the elevation of the first diode above the bottom 130, having a greater-than-zero or at least greater than other photo diodes 145 below the liquid surface.

Figure 10:
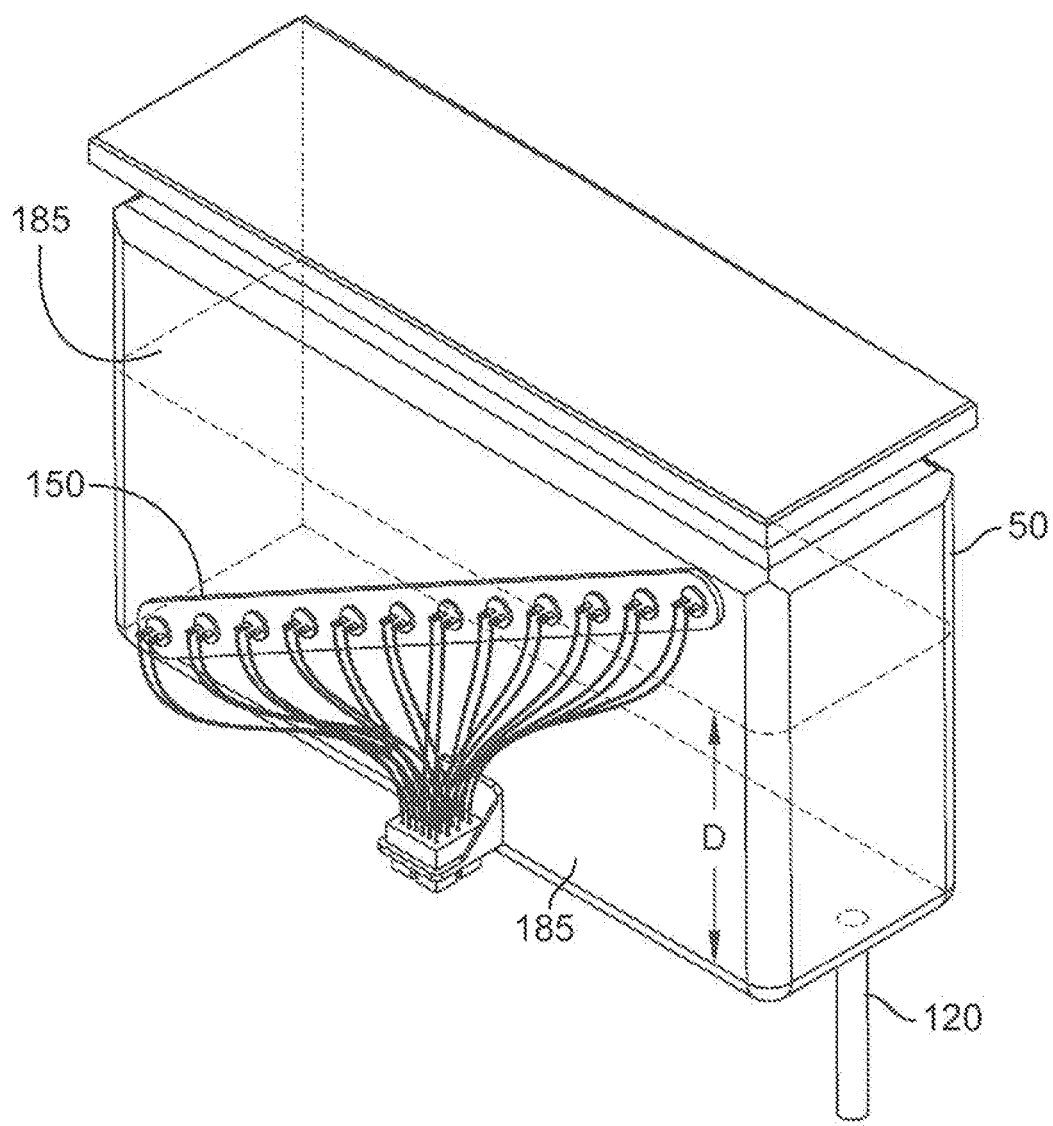
FIG. 10 is a left side perspective view showing light sources used with another embodiment of a liquid sensor.

In another embodiment, the photo diodes 145 detect infrared and/or visible light emitted from an opposing array of IR or visible-light emitting diodes (LEDs) 150 arranged on the opposite side of the translucent or semi-translucent tank 50 as shown in FIG. 10. If the liquid 45 in the tank 50 is at least partially opaque, photo diodes 145 below the top of the surface 160 of the liquid 45 will not detect light emitted from the LED's 150 and will have zero or near-zero output voltages. As with the diodes that detect ambient light, light from the LED's 150 that is detected by one or more of the photo diodes 145 permits the liquid height D to be accurately estimated or determined exactly by comparing the voltages output from all the photodiodes.

FIG. 11 is cross-sectional diagram of one photo diode 145. A lens 160 on the inside surface of the side wall 170 of the container 50 detects light incident on the lens 160. A collar 175 provides a liquid-tight seal for the diode 145 so that liquid does not leak past the wall 170. Small voltages generated by the light 180 that impinges the diode 145 cause the diode to generate a small electrical signal which can be amplified and detected as being present or absent by the computer 30.

Figure 12:
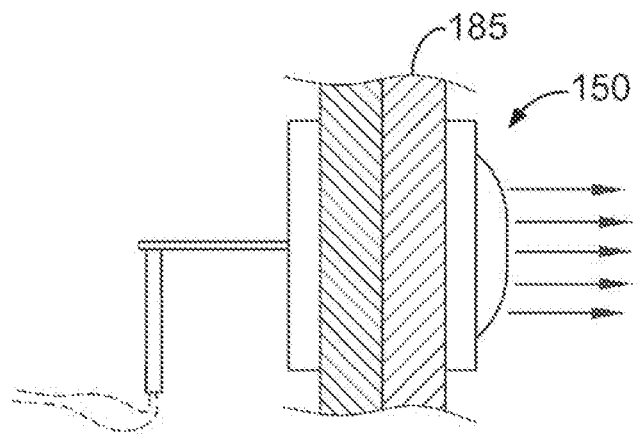
FIG. 12 is a cross sectional view of a light source.

FIG. 12 depicts the similar structure of a light emitting diode 150, inserted through the side wall 185 of the tank 50, opposite the side wall 170 holding the photo diodes 145.

Figure 13:
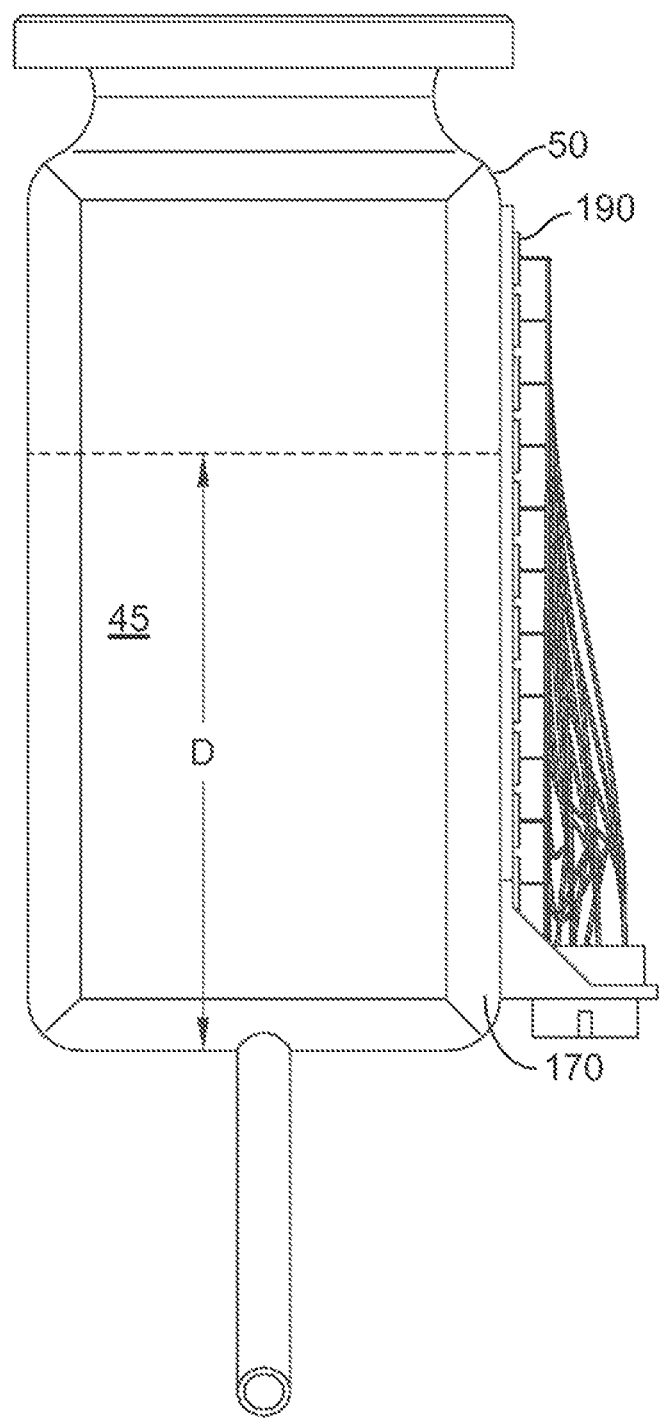
FIG. 13 is a front view of an alternate embodiment of a container and showing an alternate liquid sensor.

FIG. 13 depicts another structure for determining the depth of liquid 45 in the container. FIG. 13 is a front view of the container 50 and shows an array of conductivity or resistance probes 190 configured to extend through the side wall 170 so that the probes 190 "reach" into the interior of the container 50.

Figure 14:
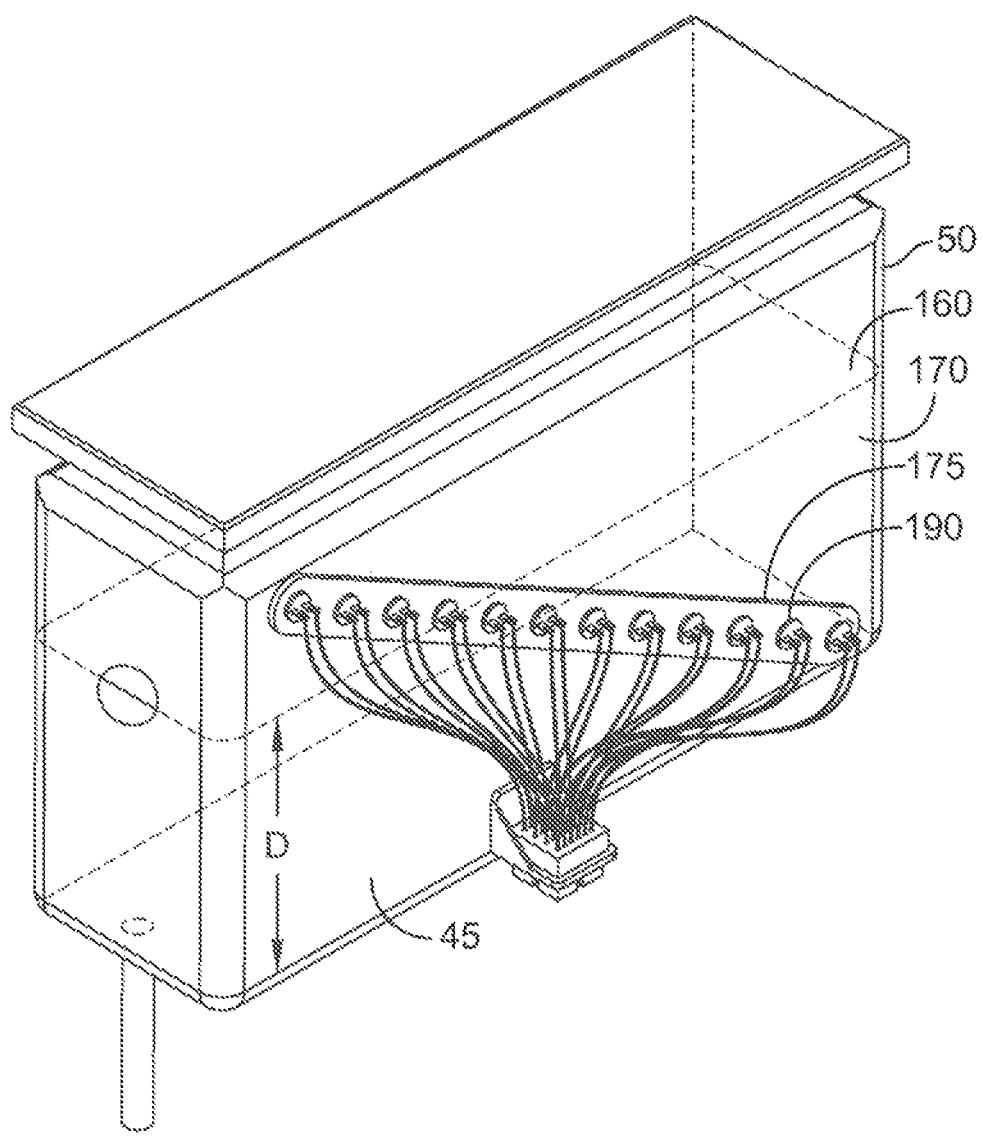
FIG. 14 is a perspective view of the container shown in FIG. 13.

FIG. 14 is a perspective view of the right-hand side of the tank, showing the conductivity probes 190 to be arranged in an inclined, linear array. As with the photo diodes and LEDs, the inclined array 190 permits more probes to be used, with less vertical separation distance between them.

Figure 15:
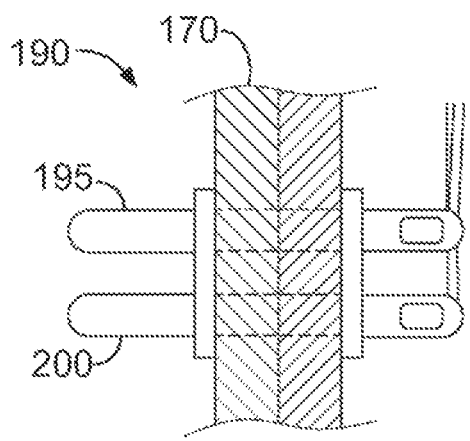
FIG. 15 is a cross sectional view of a detector or sensor for use with the container shown in FIGS. 13 and 14.

FIG. 15 is a top view of one of the probes 190. If a conductive pathway exists between the two conductors 195 and 200, as will happen when the conductors are submerged in even a partially-conductive liquid like milk or cream, an electrical signal applied to one conductor 195 can be detected at the adjacent conductor 200. A conductive pathway will exist if the depth D inside the tank 50 is high enough for liquid to be between the two conductors. Cream has a conductivity greater than 10 times greater than air.

Figure 16:
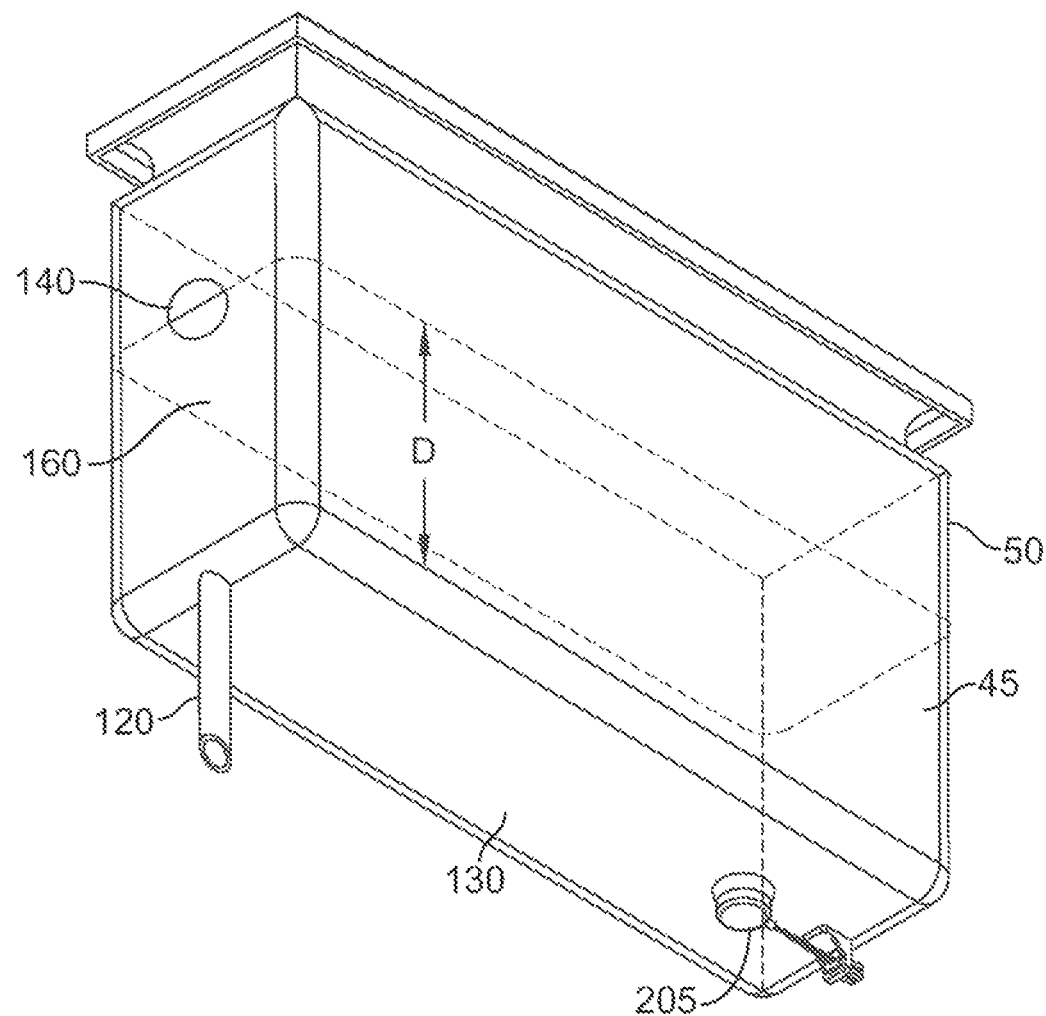
FIG. 16 is a perspective view of another embodiment of a container and another liquid detector.

FIG. 16 depicts an ultrasonic transducer 205, acoustically coupled to or through the bottom 130 of the tank 50. Sound waves emitted from the ultrasonic range finder transducer 205 will be reflected at the interface between the liquid surface 160 and the empty upper portion of the tank 50. The time required for an ultrasonic pulse to transit from the transducer 205 to the interface and return can be used to directly calculate the depth D of the liquid in the tank 50. In an alternate embodiment not shown, the ultrasonic transducer 205 can be mounted at the top of the tank so as to transmit ultrasonic waves downward to the top 205 of the liquid 45.

Once the liquid level is determined using one or more of the embodiments shown, a close approximation of the time required to hold the valve open to dispense a requested volume can be directly calculated using a well-known equation inset below. Equation (1) inset below, is an equation to calculate the time required to hold the valve open in order to dispense a volume of liquid from a tank. The dispensed volume will of course lower the height of the liquid in the tank from an initial height $h_0$ to a lesser height denominated as $h_2$. The valve open time to pen is a function of the starting and ending depth of the liquid in the tank and the ratio of the area of the tank to the cross sectional area of the tube through which the liquid discharges.

$$t_{open} = \frac{\sqrt{h_0} - \sqrt{h_2}}{\sqrt{g/2}} \left(\frac{A_{tank}}{A_{jet}}\right)^2 \quad \text{Equation 1}$$

$t_{open}$=the time required to hold the valve open to dispense a user-specified volume of liquid from a tank;
$h_0$=the initial or starting level of liquid in the tank before the valve is opened, measured from the top of the liquid to the lowest level of the tank, i.e., at the pinch valve;
$h_2$=the final level of liquid in the tank to which the initial level $h_0$ drops after the user-specified volume is dispensed;
g=the gravitational acceleration constant;
$A_{tank}$=the surface area of the top of the tank;
$A_{jet}$=the cross sectional area of the jet or tube through which liquid leaves the tank;

Equation (1) is by Yunus A. Cengal and John M. Cibala, FLUID MECHANICS, FUNDAMENTALS AND APPLICATIONS, pp. 179-180, McGraw Hill, Higher Education, copyright 2006.

The various structures described above can determine an actual depth of liquid in a container. Knowing the actual depth D of the liquid thereby permits a direct calculation of the valve open time that is required to dispense a specific volume of liquid, such as one ounce, two ounces, three ounces, and so forth.

For clarity purposes, opening the dispensing valve 40 is comprised of the steps of the computer 30 receiving one or more signals from the user interface or switches 35 located on the container 15. Those switches 35 can be configured under software control to dispense multiple volumes on each actuation or to dispense volumes that are additive of the particular switches that are activated. Once a volume of liquid to be dispensed is specified, the liquid surface height is determined empirically using one or more of the structures and devices described above and equivalents thereof. Once the requested volume is known and the liquid level height is known, the computer 30 calculates the open time and sends an appropriate signal to the solenoid or an interface thereof to open the valve and, of course, close the valve at the termination of the time period.

Those of ordinary skill in the art will recognize that the method of determining valve open time using equation (1) can be used with any size container and any size discharge tube. By specifying the surface area of the container and the cross sectional area of the discharge tube, the calculation of valve open time remains a straight forward calculation using the level of the liquid in the container, which can be empirically determined using one or more of the structures disclosed herein.

The foregoing description is for purposes of illustration only. Those of ordinary skill will recognize that the foregoing methods and apparatuses for the liquid dispenser include measuring and dispensing liquids. They can be used to dispense liquids that include water, alcohols, dairy products like milk and cream and mixtures thereof as well as oils and syrups. The foregoing description should therefore not be construed as limiting the method and/or apparatus to dispensing small volumes of liquids but is really for purposes of illustration. The true scope of the invention is set forth in the appurtenant claims.

The invention claimed is:

1. A pinch valve comprising:
a valve surface comprising a heat sink; and
a pinch bar having a first leg and a second leg substantially orthogonal to the first leg, the first leg having a length and an axis of rotation substantially parallel to the length of the first leg;
wherein the pinch bar is movable between a first position and a second position by rotation of the pinch bar about the axis of rotation, wherein in the first position the pinch valve is configured to collapse a flexible tube between the second leg and the valve surface, and in the second position, the pinch valve is configured such that the flexible tube is free of the second leg.

2. The pinch valve of claim 1, wherein the heat sink comprises a u-shaped channel configured to receive the flexible tube.

3. The pinch valve of claim 1, further comprising a dispensing tube alignment block, the heat sink disposed within the dispensing tube alignment block.

4. The pinch valve of claim 1 wherein rotation of the pinch bar from the first position to the second position moves the second leg away from the valve surface.

5. The pinch valve of claim 4 wherein rotation of the pinch bar from the second position to the first position rotates the pinch bar at least partially across the heat sink.

6. The pinch valve of claim 1, wherein when the pinch bar is in the second position, the second leg is generally vertical.

7. The pinch valve of claim 6, wherein when the pinch bar is in the first position, the second leg is generally horizontal.

8. The pinch valve of claim 1, further comprising a handle substantially orthogonal to the first leg, wherein the handle is configured to receive a user actuation to manually move the second leg from the first position to the second position.

9. The pinch valve of claim 8, wherein the pinch valve releasably retains the second leg in the second position, once manually moved into the second position.

10. The pinch valve of claim 8, further comprising a solenoid operably connected to the first leg of the pinch bar at an end of the first leg opposite the handle, the solenoid capable of moving the pinch bar.

11. A liquid dispenser comprising:
a refrigerated cabinet;
a container configured to hold a liquid to be dispensed, the refrigerated cabinet configured to receive the container therein;
a flexible tube extending from the container; and
a pinch valve comprising:
    a heat sink configured to engage the flexible tube;
    a valve surface configured to engage the flexible tube; and
    a pinch bar having a first leg and a second leg substantially orthogonal to the first leg, the first leg having a length and an axis of rotation substantially parallel to the length of the first leg;
    wherein the pinch bar is movable between a first position and a second position by rotation of the pinch bar about the axis of rotation, wherein in the first position the pinch valve is configured to collapse the flexible tube between the second leg and the valve surface, and in the second position, the second leg is configured to be positioned free from obstruction of the flexible tube.

12. The liquid dispenser of claim 11, wherein when the pinch bar is in the first position, the pinch bar occludes the flexible tube and when the pinch bar is in the second position, the flexible tube is open.

13. The liquid dispenser of claim 11, wherein the heat sink comprises the valve surface.

14. The liquid dispenser of clam 11, wherein the heat sink comprises a U-shaped channel that receives the flexible tube.

15. The liquid dispenser of claim 11, wherein when the pinch bar is in the first position, the flexible tube is resiliently secured in engagement with the valve surface and when the pinch bar is in the second position, the flexible tube is removable from engagement with the valve surface.

16. The liquid dispenser of claim 15, wherein the pinch bar in the second position facilitates placement or replacement of the container and flexible tube in the liquid dispenser.

17. The liquid dispenser of claim 11, further comprising:
at least one control switch, configured to be operable to receive a user selection of a requested volume to dispense;
at least one load sensor operatively connected to the container, the load sensor producing a signal indicative of a weight impressed upon the load sensor;
a computer operably connected to the at least one load sensor, the at least one control switch, and the pinch valve, the computer receives the signal indicative of the weight impressed upon the load sensor and the requested volume to dispense.

18. The liquid dispenser of claim 17, wherein the computer operates the pinch valve to dispense the requested volume to dispense based upon the signal indicative of the weight impressed upon the load sensor.

19. The liquid dispenser of claim 18, further comprising a solenoid operably connected to the first leg and the computer operates the solenoid to operate the pinch valve to dispense the requested volume to dispense.

* * * * *